United States Patent
Shaffer et al.

(10) Patent No.: US 10,928,621 B2
(45) Date of Patent: Feb. 23, 2021

(54) SAMPLE DISHES FOR USE IN MICROSCOPY AND METHODS OF THEIR USE

(71) Applicant: SamanTree Medical SA, Lausanne (CH)

(72) Inventors: Etienne Shaffer, Le Mont-sur-Lausanne (CH); Jonathan Abel Pirolet, Aclens (CH); Frédéric Schmitt, Vulliens (CH); Bastien Rachet, Lausanne (CH); Diego Joss, Renens (CH); Aurèle Timothée Horisberger, Chavannas-près-renens (CH)

(73) Assignee: SamanTree Medical SA, Lausanne (CH)

( * ) Notice: Subject to any disclaimer, the term of this patent is extended or adjusted under 35 U.S.C. 154(b) by 6 days.

(21) Appl. No.: 16/146,518

(22) Filed: Sep. 28, 2018

(65) Prior Publication Data

US 2019/0129158 A1 May 2, 2019

Related U.S. Application Data

(60) Provisional application No. 62/675,368, filed on May 23, 2018, provisional application No. 62/579,705, filed on Oct. 31, 2017.

(51) Int. Cl.
*G02B 21/34* (2006.01)
*G01N 21/01* (2006.01)
(Continued)

(52) U.S. Cl.
CPC ............. *G02B 21/34* (2013.01); *G01N 21/01* (2013.01); *G01N 21/6428* (2013.01); *G02B 21/367* (2013.01)

(58) Field of Classification Search
CPC .. G02B 21/34; G02B 21/367; G02B 21/0012; G02B 21/0032; G02B 21/0036;
(Continued)

(56) References Cited

U.S. PATENT DOCUMENTS

| 3,814,504 A | 6/1974 | Brady et al. |
| 4,927,254 A | 5/1990 | Kino et al. |

(Continued)

FOREIGN PATENT DOCUMENTS

| DE | 19632594 A1 | 2/1998 |
| DE | 19729245 C1 | 5/1999 |

(Continued)

OTHER PUBLICATIONS

International Search Report, PCT/EP2018/079885 (Sample Dishes for Use in Microscopy and Methods of Their Use, filed Oct. 31, 2018) issued by ISA/European Patent Office, 5 pages, dated May 29, 2019.

(Continued)

*Primary Examiner* — Sang H Nguyen
(74) *Attorney, Agent, or Firm* — William R. Haulbrook; Michael D. Schmitt; Choate, Hall & Stewart LLP

(57) ABSTRACT

Disclosed herein are sample dishes for use with microscopes that are simple to mount on a microscope and facilitate easy manipulation of tissue samples disposed thereon during imaging as well as methods of their use. A sample dish comprises an optical interface and, optionally, a support member that holds the optical interface. The optical interface of a sample dish is suitably transparent and planar such that a focal plane of a microscope can reside uniformly at or within a surface of a sample during imaging. In certain embodiments, a support member comprises a dish for holding excess fluid. In certain embodiments, a sample dish comprises separation ribs. In certain embodiments, a sample (Continued)

dish comprises one or more manipulation members (e.g., tabs). In certain embodiments, a sample dish is used with an imaging artifact reducing fluid.

31 Claims, 12 Drawing Sheets

(51) Int. Cl.
*G01N 21/64* (2006.01)
*G02B 21/36* (2006.01)

(58) Field of Classification Search
CPC ...... G02B 21/082; G02B 21/16; G01N 21/01; G01N 21/6428; G01N 2021/6439; H04N 5/2256; H04N 7/18
See application file for complete search history.

(56) References Cited

U.S. PATENT DOCUMENTS

| | | |
|---|---|---|
| 5,161,053 A | 11/1992 | Dabbs |
| 5,257,128 A | 10/1993 | Diller et al. |
| 5,463,223 A | 10/1995 | Wong et al. |
| 5,580,827 A | 12/1996 | Akamine |
| 5,689,109 A | 11/1997 | Schutze |
| 6,014,210 A * | 1/2000 | Fåhraeus ............... G02B 21/34 356/244 |
| 6,052,224 A | 4/2000 | Richardson |
| 6,133,986 A | 10/2000 | Johnson |
| 6,185,030 B1 | 2/2001 | Overbeck |
| 6,335,824 B1 | 1/2002 | Overbeck |
| 6,348,999 B1 | 2/2002 | Summersgill et al. |
| 6,392,752 B1 | 5/2002 | Johnson |
| 6,424,852 B1 | 7/2002 | Zavislan |
| 6,937,886 B2 | 8/2005 | Zavislan |
| 7,193,782 B2 | 3/2007 | Menon et al. |
| 7,225,010 B1 | 5/2007 | Zavislan |
| 7,285,089 B2 | 10/2007 | Viellerobe et al. |
| 7,312,919 B2 | 12/2007 | Overbeck |
| 7,336,417 B2 * | 2/2008 | Shimi ................... G02B 21/34 356/246 |
| 7,628,865 B2 | 12/2009 | Singh |
| 7,706,043 B2 | 4/2010 | Uhl et al. |
| 7,718,423 B2 * | 5/2010 | Tsuchiya ............... G02B 21/362 435/288.7 |
| 7,759,635 B2 | 7/2010 | Boer et al. |
| 7,968,839 B2 | 6/2011 | Merenda et al. |
| 8,121,670 B2 | 2/2012 | Zavislan |
| 8,371,182 B1 * | 2/2013 | Israelachvili ........... G01N 3/04 356/244 |
| 8,553,337 B2 | 10/2013 | Webb et al. |
| 8,606,343 B2 | 12/2013 | Zavislan |
| 9,075,227 B2 | 7/2015 | Rachet et al. |
| 9,333,036 B2 | 5/2016 | Ben-Yakar et al. |
| 9,399,220 B2 * | 7/2016 | Kubek ................... G02B 21/34 |
| 9,563,044 B2 | 2/2017 | Kosanic et al. |
| 9,678,323 B2 | 6/2017 | Orth et al. |
| 9,739,703 B2 * | 8/2017 | Matsushima ........... G01N 21/85 |
| 9,746,493 B2 * | 8/2017 | Loparic ................. A61B 10/0233 |
| 10,088,427 B2 | 10/2018 | Rachet et al. |
| 2001/0048467 A1 | 12/2001 | Fiedler |
| 2002/0088858 A1 | 7/2002 | Tanaami et al. |
| 2003/0032204 A1 | 2/2003 | Walt et al. |
| 2003/0147083 A1 | 8/2003 | Hill |
| 2004/0012853 A1 | 1/2004 | Garcia et al. |
| 2004/0204651 A1 | 10/2004 | Freeman et al. |
| 2004/0256542 A1 | 12/2004 | Okazaki |
| 2004/0264856 A1 | 12/2004 | Farr |
| 2005/0014201 A1 | 1/2005 | Deuthsch |
| 2005/0018199 A1 | 1/2005 | LeBlanc |
| 2005/0098717 A1 | 5/2005 | Grier et al. |
| 2005/0213087 A1 * | 9/2005 | Bruins ................... G01N 21/85 356/244 |
| 2006/0077536 A1 | 4/2006 | Bromage et al. |
| 2006/0121298 A1 | 6/2006 | Wittke et al. |
| 2006/0163463 A1 | 7/2006 | Grier |
| 2007/0235640 A1 | 10/2007 | Gruber et al. |
| 2008/0030742 A1 | 2/2008 | Hill |
| 2008/0121790 A1 | 5/2008 | Grier |
| 2008/0163702 A1 * | 7/2008 | Sunwoldt ............... B82Y 35/00 73/864.91 |
| 2009/0028407 A1 | 1/2009 | Seibel et al. |
| 2009/0225409 A1 | 9/2009 | Ilev et al. |
| 2010/0200739 A1 | 8/2010 | Anderson et al. |
| 2010/0207016 A1 | 8/2010 | McBride et al. |
| 2011/0116694 A1 | 5/2011 | Gareau |
| 2011/0211104 A1 | 9/2011 | Hendriks |
| 2012/0092658 A1 * | 4/2012 | Azimi ................... G01J 3/0202 356/244 |
| 2012/0133757 A1 | 5/2012 | Thomas et al. |
| 2014/0193892 A1 | 7/2014 | Mohan et al. |
| 2014/0293036 A1 * | 10/2014 | Ddecaux ............... G01N 21/255 348/80 |
| 2015/0064776 A1 * | 3/2015 | D'Antonio ............. C12M 23/10 435/288.3 |
| 2015/0085289 A1 | 3/2015 | Kang |
| 2015/0168250 A1 * | 6/2015 | Saxer ................... G01M 11/0207 356/456 |
| 2015/0355449 A1 | 12/2015 | Orth et al. |
| 2016/0018317 A1 * | 1/2016 | Matsushima .......... G01N 21/85 356/244 |
| 2016/0091799 A1 | 3/2016 | Rachet et al. |
| 2017/0150872 A1 | 6/2017 | Kosanic et al. |
| 2018/0136097 A1 * | 5/2018 | Barnett ............. G01N 35/00029 |
| 2018/0348142 A1 | 12/2018 | Rachet et al. |
| 2019/0137752 A1 | 5/2019 | Shaffer et al. |

FOREIGN PATENT DOCUMENTS

| | | |
|---|---|---|
| EP | 0294902 A1 | 12/1988 |
| EP | 0991959 B1 | 6/2004 |
| EP | 1548481 A1 | 6/2005 |
| EP | 2299307 A2 | 3/2011 |
| EP | 1011441 B1 | 7/2011 |
| GB | 2408587 A | 6/2005 |
| WO | WO-90/01716 A1 | 2/1990 |
| WO | WO-97/34171 A2 | 9/1997 |
| WO | WO-1999/03008 A1 | 1/1999 |
| WO | WO-03/035824 A1 | 5/2003 |
| WO | WO-03/056378 A1 | 7/2003 |
| WO | WO-03065774 A1 | 8/2003 |
| WO | WO-2004/025668 A2 | 3/2004 |
| WO | WO-2005/096115 A1 | 10/2005 |
| WO | WO-2007/042989 A1 | 4/2007 |
| WO | WO-2008/012767 A2 | 1/2008 |
| WO | WO-2009/064746 A2 | 5/2009 |
| WO | WO-2010/084478 A2 | 7/2010 |
| WO | WO-2011/091283 A1 | 7/2011 |
| WO | WO-2014/013412 A1 | 1/2014 |
| WO | WO-2016/156516 A2 | 10/2016 |
| WO | WO-2017/001537 A1 | 1/2017 |
| WO | WO-2019/086550 A2 | 5/2019 |

OTHER PUBLICATIONS

Written Opinion, PCT/EP2018/079885 (Sample Dishes for Use in Microscopy and Methods of Their Use, filed Oct. 31, 2018) issued by ISA/European Patent Office, 7 pages, dated May 29, 2019.
Annex to form PCT/ISA/206, International Application No. PCT/EP2018/079885 (Sample Dishes for Use in Microscopy and Methods of Their Use, filed Oct. 31, 2018), issued by ISA/European Patent Office, 2 pages, dated Mar. 15, 2019.
Provisional Opinion Accompanying the Partial Search Report, PCT/EP2018/079885 (Sample Dishes for Use in Microscopy and Methods of Their Use, filed Oct. 31, 2018) issued by ISA/European Patent Office, 3 pages, dated Mar. 15, 2019.
Afzal, R. S. et al., Optical Tweezers Using a Diode Laser, Review of Scientific Instruments, IAP 63(4):2157-2163 (1992).
Casaburi, A. et al., Two-and three-beam interferometric optical tweezers. Optics Communication, 251(4-6):393-404 (2005).

(56) References Cited

OTHER PUBLICATIONS

Constable, A. et al., Demonstration of a Fiber-Optic Light-Force Trap, Optics Letters, Optical Society of America, 18(21)1867-1869 (1993).

Cuche, E. et al., Digital Holography for quantitative phase-contrast imaging, Optics Letters, 24(5):291-293 (1999).

Davidson, N. et al, High-numerical-aperture focusing of radially polarized doughnut beams with a parabolic mirror and a flat diffractive lens, Optics Letters, 29(12)1318-1320 (2004).

Engelbrecht, C. J. et al., Ultra-compact fiber-optic two-photon microscope for functional fluorescence imaging in vivo,Optics Express, 16(8):5556-5564 (2008).

Glaser, A. K. et al., Light-sheet microscopy for slide-free non-destructive pathology of large clinical specimens, Nature Biomedical Engineering, 1(0084):1-10, (2017).

Guenther, R. et al., Device for the Optical Analysis of Samples, DE19729245C1, machine translation.

Hell, S. W. et al., Breaking the diffraction resolution limit by stimulated emission: stimulated-emission-depletion flourescence microscopy, Optics Letters 19(11):780-782 (1994).

International Search Report, PCT/EP2016/057113, 7 pages, dated Sep. 29, 2016.

Moktadir, Z. et al.. Etching techniques for realizing optical microcavity atom traps on silicon, J. Micromech. Microeng., 14(9)S82-S85 (2004).

Orth, A. and Crozier, K., Gigapizel fluorescence microscopy with a water immersion microlens array, OSA, 21(2):Optics Express 2361, 8 pages (2013).

Orth, A. and Crozier, K., Microscopy with microlens arrays: high throughput, high resolution and light-field imaging, OSA, 20(12):Optics Express 13524, 10 pages (2012).

Partial International Search, PCT/EP2016/057113, 6 pages, dated Aug. 1, 2016.

Schmitt, J. M., Optical Coherence Tomography (OCT): A Review, IEEE Journal of Selected Topics in Quantum Electronics, 5(4):1205-1215 (1999).

Tiziani, H. J. et al., Three-dimensional analysis by a microlens-array confocal arrangement, Applied Optics, 33(4):567-572 (1994).

Walecki, W. J. et al., Fast in-line surface topography metrology enabling stress calculation for solar cell manufacturing for throughput in excess of 2000 wafers per hour, Measurement Science and Technology, 19(025302):6 pages (2008).

Written Opinion, PCT/EP2016/057113, 13 pages, dated Sep. 29, 2016.

Zemanek, P. et al., Optical Trapping of Nanoparticles and Microparticles by a Gaussian Standing Wave, Optics Letters, Optical Society of America, 24(21)1448-1450 (1999).

Zhao, Y. et al., Development of a versatile two-photon endoscope for biological imaging, Biomedical Optics Express, 1(4):1159-1172 (2010).

\* cited by examiner

SAMPLE DISHES FOR USE IN MICROSCOPY AND METHODS OF THEIR USE

PRIORITY APPLICATIONS

The present application claims the benefit of U.S. Provisional Patent Application No. 62/579,705, filed Oct. 31, 2017, entitled "Sample Dishes for Use in Microscopy," and U.S. Provisional Patent Application No. 62/675,368, filed May 23, 2018, entitled "Sample Dishes for Use in Microscopy and Methods of Their Use," each of which is hereby incorporated by reference herein in its entirety.

TECHNICAL FIELD

The present disclosure relates generally to sample dishes for use in microscopy, for example, during surgical procedures and methods of their use.

BACKGROUND

Microscopy is often used as a medical imaging modality in order to characterize tissue samples, for example, for diagnostic purposes. Tissue samples are positioned on microscopes in order to image the samples. Some tissue samples, for example human tissue samples, may be potentially infectious and, thus, must not enter in direct contact with imaging equipment such as microscopes. In these cases, tissue samples are positioned on an accessory component that is mounted on the microscopes. Frequently, sample holders are used to assist in positioning the tissue samples for imaging and provide a suitable interface for disposing a sample. For example, a sample holder may be used to flatten a tissue sample so that images are uniform over a field of view. Glass slides are often used for imaging thin tissue sections. Sample holders frequently require some assembly prior to use in imaging, such as connection of interlocking parts or fastening to a microscope. Such sample holders can take appreciable time to assemble and/or mount on a microscope before imaging can occur.

SUMMARY

While medical imaging (e.g., using microscopy) can provide many benefits to a patient such as improved diagnoses or procedural outcome assessments, certain use cases require expedient imaging. For example, intraoperative imaging is highly time sensitive as increasing procedure time can increase certain risks to patients (e.g., from additional unnecessary anesthesia exposure). It is generally undesirable to significantly increase procedure times in order to facilitate intraoperative imaging despite potential benefits that may arise from performing the imaging (e.g., increasing likelihood of positive outcomes from a procedure). Surgeons may choose to use alternative assessment techniques instead of imaging if the total time required to perform the imaging is significant relative to the total procedure time. Therefore, when long periods of time are required to assemble and/or mount a sample holder or position and reposition tissue samples disposed on the holder during an imaging procedure, the likelihood that microscopy is used as an intraoperative medical imaging technique is decreased. Thus, there is a need for new sample holders that can be quickly mounted to a microscope (e.g., a confocal scanning microscope) and enable fast and simple manipulation of a tissue sample disposed thereon during imaging and methods of their use.

Disclosed herein are sample dishes for use with microscopes that are simple to mount on a microscope and facilitate easy manipulation of tissue samples disposed thereon during imaging as well as methods of their use. A sample dish in accordance with the present disclosure comprises an optical interface and a support member that holds the optical interface. The optical interface of a sample dish is suitably transparent and planar (e.g., made of glass, sapphire, or imaging grade plastic) such that a focal plane of a microscope can reside uniformly at or within a surface of a tissue sample during imaging (when the sample dish is mounted on the microscope). One side of the optical interface is mounted onto a microscope when mounting the sample dish and a sample (e.g., a tissue sample such as a resected tissue sample) is disposed on another side, opposite the mounting side, for imaging. In certain embodiments, sample dishes can be quickly mounted onto a microscope (and an imaging window of the microscope) by placing a sample dish on the microscope and allowing the mounting side of an optical interface of the sample dish to conform to the imaging window such that the optical interface is in direct contact with the imaging window over a field of view. The sample side of an optical interface of a sample dish may be exposed to a user (e.g., a surgeon) when the sample dish is mounted onto a microscope such that the user may easily manipulate a tissue sample disposed thereon, for example, using a tool such as standard surgical forceps or a hand of the user. Accordingly, images can be generated using microscopy techniques with reduced setup times due to fast mounting and sample (re-)positioning. Therefore, sample dishes disclosed herein can reduce the amount of time required to perform microscopy imaging and thereby (i) increase the number of procedures in which microscopy is used as an intraoperative assessment technique and (ii) decrease the likelihood of patient complications due to prolonged medical imaging.

In certain embodiments, images taken of a tissue sample disposed on a sample dish in accordance with the present disclosure are optimized due, at least in part, to optical characteristics of an optical interface of the sample dish. In certain embodiments, an optical interface of a sample dish consists essentially of imaging grade plastic. Imaging grade plastic can provide sufficient transparency and planarity to produce high quality images. In certain embodiments, an optical interface is between 5 µm and 500 µm thick, for example, 50 µm thick. An optical interface may be conformable (e.g., at least partially as a result of its thinness). In certain embodiments, a sample dish is a sterile, single use dish (e.g., thereby preventing or reducing contamination caused by a sample while assisting in maintaining sterility). In some embodiments, a sample dish is a non-sterile single use dish (e.g., thereby preventing or reducing contamination caused by a sample in a non-sterile environment). In certain embodiments, a dish is sterilizable (e.g., autoclavable) (e.g., and is intended to be used multiple times). A set of disposable sample dishes used with a microscope may have very small variability between the thickness of their corresponding optical interfaces (relative to a desired standardized thickness) such that minimal (e.g., no) adjustment of the imaging focal plane of a microscope needs to occur when using a new sample dish from the set (e.g., when imaging a new sample or a different portion of a sample). In some embodiments, a well-controlled manufacturing process ensures a very small variability (e.g., less than 5 µm) between thickness of optical interfaces, but for large batches of manufactured sample dishes, so that any sample dish may be used on any compatible microscope without any adjustment of the imaging focal plane of the compatible microscope(s).

In certain embodiments, a sample dish comprises one or more features that assist in handling of the sample dish. In certain embodiments, a support member comprises a ditch into which fluid on the optical interface may drain. In certain embodiments, a support member comprises a plurality of separation ribs disposed at least partially in a ditch such that the separation ribs partition the ditch in order to spread fluid out around the ditch (i.e., by preventing aggregation in one particular area of the ditch). In certain embodiments, a dish comprises one or more manipulation elements (e.g., tabs) that are used to facilitate handling of the dish such as during mounting and dismounting of the dish or reorienting of the dish. A portion of a support member of a dish may form each manipulation element. For example, when the support member is a molded (e.g., injection molded) element, manipulation elements may be formed as tabs contiguously protruding from the support member. In certain embodiments, a sample dish consists of an optical interface (e.g., without a support member).

Also disclosed herein are methods of using sample dishes with microscopes. In certain embodiments, a sample dish (e.g., one disclosed herein) is used with a microscope comprising a transparent imaging window. In certain embodiments, disposing a sample dish directly over the transparent imaging window of the microscope produces a thin layer of air between a transparent optical interface of the sample dish and the transparent imaging window. The thin layer of air may be, for example, about 10 micrometers in thickness. Direct contact between a sample dish and a transparent imaging window of a microscope may be difficult to achieve. Due to the high refractive index difference between a transparent optical interface of a sample dish, air, and a transparent imaging window of a microscope, reflections of an illumination beam of the microscope may be produced that introduce imaging artifacts, especially when the illumination beam has high coherence properties. Therefore, in certain embodiments, a method of preparing to image a sample using a sample dish (e.g., one disclosed herein) comprises disposing an imaging artifact reducing fluid between a transparent optical interface of a sample dish and a transparent imaging window.

An imaging artifact reducing fluid is a fluid having a refractive index closer to at least one of a transparent imaging window and a transparent optical interface of a sample dish than the refractive index of air. An imaging artifact reducing fluid may be used to form a thin layer of approximately the same thickness as an air layer that would otherwise form absent the presence of the fluid.

In certain embodiments, a microscope is used for fast imaging of a sample such as intraoperative imaging of a resected tissue sample in an operating theater. Therefore, it may be desirable for an imaging artifact reducing fluid to be readily available, easy to clean, and/or suitable (e.g., sterile and/or purified) for use in an operating theater. In certain embodiments, an imaging artifact reducing fluid comprises (e.g., is) water (e.g., purified and/or de-ionized water). For example, an imaging artifact reducing fluid can be a saline solution (e.g., a saline solution used in a hospital). Water can be cleaned from a transparent imaging window between samples without the need for using a solvent or extensive removal procedures (e.g., scrubbing or scraping).

In one aspect, the present invention is directed to a sample dish for use in imaging a sample (e.g., a tissue sample, such as a resected tissue sample) (e.g., using a scanning microscope, such as a confocal scanning microscope), the dish comprising a substantially planar transparent optical interface having a sample side and a mounting side opposite the sample side; and optionally, a support member, wherein the support member at least partially surrounds [e.g., borders (e.g., at least partially)] the optical interface and the optical interface is attached (e.g., glued, heat sealed, welded, or adhered) to the support member (e.g., wherein the support member is a one-part component or the sample dish is a one-part component).

In certain embodiments, the sample dish is disposable (e.g., is a single use dish) (e.g., is intended to be used only once). In certain embodiments, the sample dish is sterile [e.g., suitable for use by a sterile scrub suited user (e.g., surgeon) during a surgical procedure]. In certain embodiments, the sample side is exposed to a user when the sample dish is mounted on a microscope. In certain embodiments, the sample dish is sterilizable (e.g., autoclavable) (e.g., wherein the sample dish is intended for multiple uses, e.g., multiple but a limited number of uses, e.g., disposable after a limited number of uses).

In certain embodiments, the sample dish comprises one or more manipulation elements (e.g., tabs) that protrude from the support member of the dish [e.g., such that the one or more manipulation elements can be grasped (e.g., by a user's hand or a grasping tool) when placing, positioning, and/or removing the sample dish from a microscope]. In certain embodiments, the one or more manipulation elements are two manipulation elements (e.g., tabs) that can be grasped by a user's hands (e.g., when mounting, positioning/orienting, and/or dismounting the sample dish from a microscope). In certain embodiments, the one or more manipulation elements are disposed (e.g., uniformly) around a periphery of the dish. In certain embodiments, each of the one or more manipulation elements is a portion of the support member.

In certain embodiments, the optical interface is circular in cross section [e.g., shaped as a very thin cylinder (e.g., having a diameter much larger than a height)]. In certain embodiments, the optical interface has a diameter of at least 50 mm (e.g., a diameter of at least 75 mm, at least 100 mm, at least 150 mm, or at least 159 mm) [e.g., wherein the diameter of the optical interface exceeds a field of view of a scanning microscope (e.g., a confocal scanning microscope) when the sample dish is mounted on the scanning microscope (e.g., wherein the field of view is at least 40 mm in a first dimension and 30 mm in a second dimension perpendicular to the first dimension)]. In certain embodiments, the optical interface has a diameter of about 159 mm (e.g., of 159 mm). In certain embodiments, the optical interface has a thickness between 5 μm and 500 μm (e.g., between 10 μm and 250 μm, between 10 μm and 100 μm, between 25 μm and 75 μm, between 40 μm and 60 μm, or between 45 μm and 55 μm). In certain embodiments, the optical interface has a thickness of about 50 μm.

In certain embodiments, the optical interface comprises at least one of imaging grade plastic, sapphire, and glass. In certain embodiments, the optical interface consists essentially of imaging grade plastic.

In certain embodiments, the optical interface is flexible (e.g., conformable to an imaging window of a microscope) [e.g., such that the mounting side of the optical interface conforms to the imaging window thereby coming into direct contact over an entire area of the imaging window (e.g., such that no air gap between the optical interface and the imaging window exists within the entire area) (e.g., such that the optical interface does not generate imaging artifacts due to its motion and/or planarity during imaging)]. In certain embodiments, the optical interface is sized and shaped such that only the optical interface of the sample dish contacts a microscope when the sample dish is mounted on the microscope (e.g., thereby maintaining planarity of the optical interface).

In certain embodiments, the support member comprises a ditch that surrounds a periphery of the optical interface (e.g., such that liquid on the optical interface can drain into the ditch). In certain embodiments, the ditch is at least 3 mm deep [e.g., at least 4 mm, at least 5 mm, at least 6 mm, at least 7 mm, or at least 10 mm deep (e.g., between 4 mm and 10 mm, between 6 mm and 10 mm, or between 4 mm and 7 mm deep)]. In certain embodiments, the ditch can contain at least 5 mL of fluid [e.g., at least 7 mL, at least 8 mL, at least 10 mL, or at least 15 mL of fluid (e.g., between 7 mL and 15 mL, between 8 mL and 12 mL, or about 10 mL of fluid)] (e.g., without any fluid being on an optical interface of the sample dish).

In certain embodiments, the support member comprises a plurality of separation ribs disposed at least partially within the ditch such that the plurality of separation ribs partition the ditch (e.g., wherein each of the plurality of separation ribs is oriented radially relative to a center of the optical interface).

In certain embodiments, the ditch comprises an outer lip and an inner lip and the optical interface is disposed above the inner lip (e.g., wherein the optical interface is attached to a portion of the inner lip). In certain embodiments, the optical interface is disposed such that a surface of the optical interface on the sample side is above the outer lip (e.g., when the sample dish is mounted on a microscope) [e.g., thereby maximizing lateral access to the optical interface (e.g., a tool or hand of a user)]. In certain embodiments, the optical interface is disposed such that a surface of the optical interface on the sample side is below the outer lip (e.g., when the sample dish is mounted on a microscope) (e.g., such that fluid that at least partially immerses the sample is contained, at least in part, by the outer lip).

In certain embodiments, the support member has a surface roughness ($R_a$) of no more than 6 micrometers, no more than 4 micrometers, no more than 3 micrometers, or no more than 2.5 micrometers. In certain embodiments, the support member comprises an outwardly sloped inner lip (e.g., the support member comprises a ditch comprising the inner lip).

In certain embodiments, the optical interface has a relative mass variation of no more than 0.1% (e.g., no more than 0.01%) as measured using a ASTM International D570 test.

In certain embodiments, a set of sample dishes comprising a plurality of sample dishes, wherein, for each of the plurality of sample dishes, a thickness of the optical interface is within 5 μm (e.g., 4 μm, 3 μm, 2 μm, or 1 μm) of a standardized thickness (e.g., 50 μm) for the set (e.g., such that the focal plane of the microscope does not need to be adjusted between sample dishes to account for variation in thickness). In certain embodiments, for each of the plurality of sample dishes, a thickness of the optical interface is within 2 μm (e.g., 1.5 μm) of a standardized thickness (e.g., 50 μm) for the set (e.g., no more than 2 μm thicker or 2 μm thinner than the standardized thickness). In certain embodiments, the plurality of sample dishes comprises at least 20 (e.g., at least 30, at least 40, at least 50, or at least 60) sample dishes.

In another aspect, the present invention is directed to a method of imaging a sample using a scanning microscope (e.g., a scanning confocal microscope), the method comprising: mounting a sample dish on the scanning microscope, wherein the sample dish comprises: a support member, and a substantially planar transparent optical interface having a sample side and a mounting side opposite the sample side, wherein the support member surrounds the optical interface and the optical interface is attached (e.g., glued, welded, adhered) to the support member and the sample side is exposed to a user when the support dish is mounted on the microscope; positioning a tissue sample (e.g., a resected tissue sample) on an optical interface of the sample dish using a tool (e.g., forceps, tweezers); and imaging the tissue sample while the tool maintains a position of the tissue sample on the optical interface (e.g., wherein imaging comprises scanning an array of micro-optical elements along a scan pattern and detecting light reflected from the tissue during the scanning). In certain embodiments, the method comprises repositioning the tissue sample on the optical interface of the sample dish into a second position using the tool; and imaging the tissue sample while the tool maintains the second position (e.g., wherein imaging comprises scanning an array of micro-optical elements along a scan pattern and detecting light reflected from the tissue during the scanning). In certain embodiments, the mounting step comprises: placing the sample dish on an imaging window of the microscope such that the optical interface of the sample dish conforms to the imaging window.

In another aspect, the present invention is directed to a sample dish for use in imaging a sample (e.g., a tissue sample, such as a resected tissue sample) (e.g., using a scanning microscope, such as a confocal scanning microscope), the dish comprising: a flexible transparent optical interface comprising imaging grade plastic, the optical interface having a sample side and a mounting side opposite the sample side [e.g., wherein the optical interface has a thickness of no more than 200 μm (e.g., no more than 100 μm or no more than 60 μm)] [e.g., such that the mounting side of the optical interface conforms to an imaging window of a microscope thereby coming into direct contact over an entire area of the imaging window (e.g., such that no air gap between the optical interface and the imaging window exists within the entire area) (e.g., such that the optical interface does not generate imaging artifacts due to its motion and/or planarity during imaging)]; and optionally, a support member, wherein the support member at least partially surrounds [e.g., borders (e.g., at least partially)] the optical interface and the optical interface is attached (e.g., glued, heat sealed, welded, or adhered) to the support member.

In another aspect, the present invention is directed to a method of preparing to image a sample using a microscope in order to reduce imaging artifacts, the method comprising: providing the microscope, wherein the microscope comprises (i) a housing comprising an imaging window support and (ii) a transparent imaging window, wherein the transparent imaging window is disposed on [e.g., attached (e.g., glued) to] the transparent imaging window support such that an illumination beam provided by the microscope can pass from below the transparent imaging window support through at least a portion of the transparent imaging window when imaging the sample; disposing an imaging artifact reducing fluid on the transparent imaging window (e.g., only a portion thereof); providing a sample dish comprising a substantially planar transparent optical interface having a sample side and a mounting side opposite the sample side; and disposing the sample dish over the transparent imaging window such that the imaging artifact reducing fluid is disposed between and in contact with the mounting side of the transparent optical interface of the sample dish and the transparent imaging window and the imaging artifact reducing fluid has a substantially uniform thickness contiguously over the at least a portion of the transparent imaging window through which the illumination beam can pass when imaging the sample (e.g., over the entire transparent imaging window).

In certain embodiments, the substantially uniform thickness of the imaging artifact reducing fluid is no more than 30 micrometers. In certain embodiments, the substantially uniform thickness of the imaging artifact reducing fluid is about 10 micrometers.

In certain embodiments, the transparent imaging window has a refractive index that is higher than a refractive index of the transparent optical interface of the sample dish (e.g., wherein the refractive index of the transparent imaging window is at least 1.7 and the refractive index of the transparent optical interface is between 1.45 and 1.55). In certain embodiments, the transparent imaging window comprises sapphire (e.g., consists essentially of sapphire) and the transparent optical interface comprises imaging grade plastic.

In certain embodiments, the imaging artifact reducing fluid comprises water. In certain embodiments, the imaging artifact reducing fluid is a saline solution. In certain embodiments, the imaging artifact reducing fluid is water [e.g., purified (e.g., sterilized) and/or de-ionized water]. In certain embodiments, the imaging artifact reducing fluid comprises isopropyl alcohol (e.g., is a solution of 60-80 wt % isopropyl alcohol in water). In certain embodiments, the imaging artifact reducing fluid has a refractive index between a refractive index of the transparent imaging window and a refractive index of the transparent optical interface of the sample dish [e.g., is an index matching fluid (e.g., a refractive index matching oil)].

In certain embodiments, the imaging artifact reducing fluid wets the at least a portion of the transparent imaging window (e.g., prior to the sample dish being disposed over the transparent imaging window). In certain embodiments, (i) disposing the imaging artifact reducing fluid on at least a portion of the transparent imaging window comprises disposing a plurality of isolated drops of the imaging artifact reducing fluid on the transparent imaging window; and (ii) disposing the sample dish over the transparent imaging window comprises spreading the plurality of isolated drops of the imaging artifact reducing fluid (e.g., at least in part by capillary forces and/or by applying pressure to the sample dish) such that the imaging artifact reducing fluid has the substantially uniform thickness contiguously over the at least a portion of the transparent imaging window through which the illumination beam can pass when imaging the sample. In certain embodiments, the spreading occurs, at least in part, as a result of the sample being disposed on the sample dish (e.g., the pressure is applied, at least in part, by weight of the sample on the sample dish). In certain embodiments, spreading the imaging artifact reducing fluid over the at least a portion of the transparent imaging window (e.g., the entire transparent imaging window) using a spreading device (e.g., a squeegee).

In certain embodiments, the transparent imaging window comprises an anti-reflection coating coated on a surface of the transparent imaging window such that the anti-reflection is in contact with the imaging artifact reducing fluid.

In certain embodiments, the transparent imaging window is disposed at least partially above the transparent imaging window support such that a surface of the transparent imaging window is more than 30 micrometers (e.g., at least 100 micrometers) above a surface of the transparent imaging window support.

In certain embodiments, a portion of the imaging artifact reducing fluid leaks from between the transparent imaging window and the transparent optical interface (e.g., thereby reducing the substantially uniform thickness) and is contained, at least in part, by an imaging window support base of the housing to which the transparent imaging window support is attached (e.g., wherein optics of the microscope are contained, at least in part, by the transparent imaging window support base of the housing such that the portion of the imaging artifact reducing fluid that has leaked cannot contact the optics).

In certain embodiments, the transparent imaging window support comprises an opening having an area no more than 50% larger (e.g., no more than 40% larger or no more than 25% larger) than a field of view of the microscope (e.g., over which the illumination beam may be scanned) and the at least a portion of the transparent imaging window is at least as large as the area of the opening.

In certain embodiments, the imaging artifact reducing fluid does not substantially evaporate from between the transparent imaging window and the transparent optical interface (e.g., such that the imaging artifact reducing fluid remains in a contiguous layer of a substantially uniform thickness over the at least a portion of the transparent imaging window) for at least 15 minutes (e.g., at least 20 minutes, at least 30 minutes, or at least 45 minutes).

In certain embodiments, the transparent imaging window and the sample dish are each circular. In certain embodiments, the transparent imaging window and the sample dish each have a diameter of at least 80 mm (e.g., about 100 mm).

In certain embodiments, the microscope is disposed in an operating room.

In certain embodiments, removing the sample dish from over the transparent imaging window; and cleaning the transparent imaging window (e.g., for later use of the microscope) without using a solvent (e.g., by wiping, absorbing, or evaporating the imaging artifact reducing fluid from the transparent imaging window).

In certain embodiments, the sample dish is a sample dish disclosed herein.

In certain embodiments, the microscope comprises an array of micro-optical elements for use in imaging the sample such that the illumination beam passes through each of the micro-optical elements in the array during imaging (e.g., wherein the microscope is the system of any one of claims 1-85 of U.S. Provisional Patent Application No. 62/597,346).

In another aspect, the present invention is directed to a kit comprising a set of sample dishes disclosed herein and an imaging artifact reducing fluid, wherein the imaging artifact reducing fluid is for disposing between a transparent imaging window of a microscope and one of the set of sample dishes (e.g., such that imaging artifacts are reduced when imaging a sample).

In another aspect, the present invention is directed to a microscope for imaging a sample using a microscope with reduced imaging artifacts, the microscope comprising: a housing comprising an imaging window support and (ii) a transparent imaging window, wherein the transparent imaging window is disposed on [e.g., attached (e.g., glued) to] the transparent imaging window support such that an illumination beam provided by the microscope can pass from below the transparent imaging window support through at least a portion of the transparent imaging window when imaging the sample; an imaging artifact reducing fluid; and a sample dish comprising a substantially planar transparent optical interface having a sample side and a mounting side opposite the sample side, wherein the sample dish is disposed over the transparent imaging window such that the imaging artifact reducing fluid is disposed between and in contact with the mounting side of the transparent optical interface of the sample dish and the transparent imaging window and the imaging artifact reducing fluid has a substantially uniform thickness contiguously over the at least a portion of the transparent imaging window through which the illumination beam can pass when imaging the sample (e.g., over the entire transparent imaging window).

In certain embodiments, the housing comprises an imaging window support base disposed below (e.g., partially under) the imaging window support and the housing is waterproof such that fluid that leaks from near the transparent imaging window is contained by the housing (e.g., at least in part by the imaging window support base).

In certain embodiments, the substantially uniform thickness of the imaging artifact reducing fluid is no more than 30 micrometers. In certain embodiments, the substantially uniform thickness of the imaging artifact reducing fluid is about 10 micrometers.

In certain embodiments, the transparent imaging window has a refractive index that is higher than a refractive index of the transparent optical interface of the sample dish (e.g., wherein the refractive index of the transparent imaging window is at least 1.7 and the refractive index of the transparent optical interface is between 1.45 and 1.55). In certain embodiments, the transparent imaging window comprises sapphire (e.g., consists essentially of sapphire) and the transparent optical interface comprises imaging grade plastic.

In certain embodiments, the imaging artifact reducing fluid comprises water. In certain embodiments, the imaging artifact reducing fluid is a saline solution. In certain embodiments, the imaging artifact reducing fluid is water [e.g., purified (e.g., sterilized) and/or de-ionized water]. In certain embodiments, the imaging artifact reducing fluid comprises isopropyl alcohol (e.g., is a solution of 60-80 wt % isopropyl alcohol in water). In certain embodiments, the imaging artifact reducing fluid has a refractive index between a refractive index of the transparent imaging window and a refractive index of the transparent optical interface of the sample dish [e.g., is an index matching fluid (e.g., a refractive index matching oil)].

In certain embodiments, the transparent imaging window comprises an anti-reflection coating coated on a surface of the transparent imaging window such that the anti-reflection is in contact with the imaging artifact reducing fluid.

In certain embodiments, the transparent imaging window and the sample dish are each circular. In certain embodiments, the transparent imaging window and the sample dish each have a diameter of at least 80 mm (e.g., about 100 mm).

In certain embodiments, the microscope is disposed in an operating room.

In certain embodiments, the transparent imaging window support comprises an opening having an area no more than 50% larger (e.g., no more than 40% larger or no more than 25% larger) than a field of view of the microscope (e.g., over which the illumination beam may be scanned) and the at least a portion of the transparent imaging window is at least as large as the area of the opening.

BRIEF DESCRIPTION OF THE DRAWINGS

Drawings are presented herein for illustration purposes, not for limitation. The foregoing and other objects, aspects, features, and advantages of the invention will become more apparent and may be better understood by referring to the following description taken in conjunction with the accompanying drawings, in which.

DETAILED DESCRIPTION OF CERTAIN EMBODIMENTS

Figure 1:
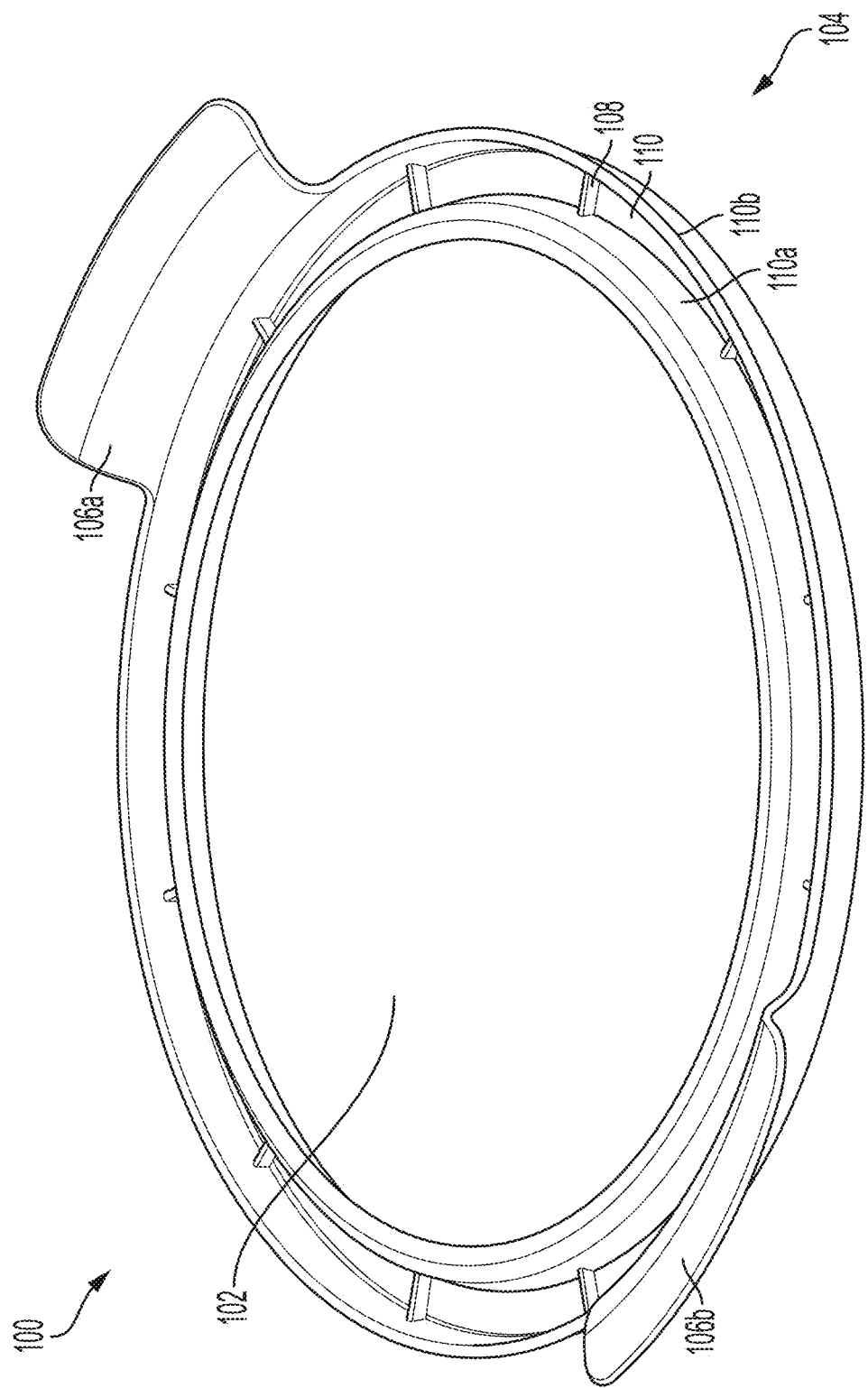
FIG. 1 shows an illustrative sample dish, according to illustrative embodiments of the invention.

It is contemplated that systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

In this application, the use of "or" means "and/or" unless stated otherwise. As used in this application, the term "comprise" and variations of the term, such as "comprising" and "comprises," are not intended to exclude other additives, components, integers or steps. As used in this application, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

In accordance with the present disclosure, a sample dish comprises an optical interface onto which a sample is disposed when imaging the sample using the sample dish. A sample can be a tissue sample, for example, a resected tissue sample. In some embodiments, a support member at least partially surrounds (e.g., borders) an optical interface (e.g., around its periphery) and is attached to the optical interface. In some embodiments, a support member surrounds (e.g., borders) an optical interface. As used herein, "surrounds" and "borders" are used interchangeably. A support member may at least partially surround an optical interface in two dimensions or three dimensions. An optical interface can be attached to a support member by gluing (e.g., comprising using a surface activation plasma or corona treatment beforehand), welding (e.g., heat sealing or laser welding), adhering (e.g., using an adhesive), or an alternative suitable means. In some embodiments, an optical interface is heat sealed to a support member.

In some embodiments a surface of an optical interface overlaps a surface of a support member such that the optical interface and the support member are attached at the overlapping area. For example, in some embodiments, a sample dish comprises an optical interface that is a very thin cylinder (with a diameter much larger than a height) and a support member, wherein an inner diameter of the support member is slightly smaller than the diameter of the optical interface such that there is an annular overlap between the optical interface and the support member (e.g., of 1-5 mm or of at least 2 mm) along which the two are heat sealed. In some embodiments, a support member provides mechanical stability to an optical interface and allows a sample dish to be handled without necessarily contacting the optical interface. In some embodiments, an optical interface is attached (e.g., glued, welded, or heat sealed) to a support member such that the optical interface can hold a weight of at least 50 g (e.g., at least 100 g, at least 300 g, at least 500 g, at least 1 kg, at least 3 kg, at least 5 kg or at least 6 kg) for at least 1 minute (e.g., at least 2 minutes or at least 5 minutes).

A support member may be solid or enclosed (e.g., having the shape of a solid or enclosed three-dimensional annulus or torus or portion thereof). A support member at least partially surrounding an optical interface may have an outermost peripheral extent that approximately coincides with an outermost periphery of an optical interface (e.g., such that one cannot see the support member stick out from the periphery of the optical interface when viewed from above). In certain embodiments, an optical interface is disposed at least partially inside of a channel running through a support member (e.g., if the support member is a three-dimensional annulus or torus). A support member can be, but is not necessarily substantially transparent.

In certain embodiments, a support member is an injection molded element. In certain embodiments, a support member is injection molded using a mold that has a low surface roughness, such as a surface roughness ($R_a$) of no more than 10 micrometers, no more than 5 micrometers, no more than 4 micrometers, no more than 3 micrometers, or no more than 2 micrometers. In certain embodiments, use of a low-surface-roughness mold for injection molding provides a support member having a surface with a low coefficient of friction when mounting a sample dish on an imaging window.

A sample dish may be a disposable dish such that it is intended for a single use only. A sample dish may be sterile such that it assists in maintaining sterility during a surgical procedure. In some embodiments, a sterile sample dish is suitable for use by a user in a sterile zone of a room (e.g., a surgeon in an operating room who has scrubbed into a surgery). In certain embodiments, a sample dish is a sterile, single use, disposable dish. In certain embodiments, a dish is sterilizable (e.g., autoclavable) (e.g., and is intended to be used multiple times). For example, a dish may be intended for use multiple times, but a limited number of times (e.g., may be disposable after some limited number of uses) and may be sterilizable (e.g., autoclavable) between each use or after a certain number of uses.

A sample dish may be engineered such that a sample side of its optical interface is exposed to a user when the sample dish is mounted on a microscope. An exposed sample side allows convenient manipulation of any sample disposed thereon during imaging without requiring one or more additional manipulation steps (such as removing and replacing a lid or similar). Moreover, certain samples, such as certain resected tissues, are soft and will naturally deform over an optical interface prior to or during imaging. A sample dish with an exposed sample side in accordance with certain embodiments disclosed herein allows a sample to be accessed by hands and/or with standard manipulation tools, such as surgical forceps, during imaging. In certain embodiments, an exposed sample side of an optical interface allows a user (e.g., a surgeon) to use forceps to position and/or orient a sample and leave the forceps holding the sample in place during imaging in order to maintain a desired position and/or orientation of the sample. In certain embodiments, tissue flattening is desirable and an exposed sample side of an optical interface allows a flattening tool to be used during imaging.

An optical interface may be any shape and size sufficient to extend over a field of view of an imaging window of a microscope when the corresponding sample dish is mounted onto the microscope. For example, an optical interface may have a planar polygonal (e.g., square or rectangular) or circular shape. In certain embodiments, an optical interface is circular and the support member the optical interface is attached to has a corresponding ring shape. The isotropy of a circular optical interface may assist in mounting a sample dish by reducing or eliminating the possibility of mispositioning the sample dish. In certain embodiments, an optical interface is large enough to accommodate a large sample such that the entire portion of the sample in contact with the sample side of the optical interface can be imaged without requiring the sample or the sample dish to be moved. In certain embodiments, an optical interface is large enough to fully accommodate a large sample. In some embodiments, a sample dish is sized and shaped to accommodate movement over a microscope to present different areas of a tissue sample disposed thereon to the microscope. Such a sample dish may be useful if a field of view of a microscope is smaller than the area of a sample in contact with an optical interface of a sample dish. In certain embodiments, an optical interface has a diameter of at least 50 mm. For example, a diameter of at least 75 mm, at least 100 mm, at least 150 mm, or at least 159 mm. In certain embodiments, an optical interface has a diameter of 159 mm. For example, resected tissue samples during breast lumpectomies can be up to 100 mm in diameter. Certain microscopes comprise an imaging window with a sufficiently large field of view to image the 100 mm diameter resected tissue sample. If an optical interface of a sample dish for use with such certain microscopes is 159 mm, the optical interface is large enough to image an entire surface of the 100 mm diameter resected tissue sample in contact with the optical interface without needing to reposition the sample dish or the resected tissue sample. In certain embodiments, a sample dish comprises an optical interface with a larger area than a 48×36 mm field of view of a microscope with which the sample dish is used.

An optical interface of a sample dish has a thickness that allows a focal plane of a microscope onto which the sample dish is mounted to reside at or within a surface of a sample disposed in contact with the optical interface, when the sample is disposed on the sample dish and the sample dish is mounted on the microscope. In certain embodiments, an optical interface has a thickness between 5 µm and 500 µm. For example, an optical interface may have a thickness between 10 µm and 250 µm, between 10 µm and 100 µm, between 25 µm and 75 µm, between 40 µm and 60 µm, or between 45 µm and 55 µm. In certain embodiments, an optical interface has a thickness of 50 µm.

Physical properties and/or dimensions of a substantially planar optical interface (e.g., thickness or refractive index distribution) of a sample dish may be engineered such that a surface or interior of a sample disposed on the sample side of an optical interface of a sample dish falls within the focal plane depth of a microscope (e.g., throughout a field of view of the microscope) (e.g., after the sample dish is mounted on the microscope). Such sample dishes ensure an in-focus image throughout the field of view without the need for focusing or autofocusing routines after a sample dish is mounted or between mountings of the sample dish(es). In some embodiments, imaging using a sample dish with a substantially planar optical interface can occur in a shorter period of time (e.g., due to time saved from eliminating an autofocus routine) and thus use of the sample dish is desirable, especially for time-sensitive applications, such as intraoperative medical imaging. For a sample dish to be used on a microscope without need for any focusing or autofocusing routines, an optical interface of the sample dish should be substantially planar, at least over the portion that lies above a field of view of the microscope when the sample dish is mounted thereon. As used herein, a substantially planar optical interface is an optical interface in which natural variation in the height of a surface (e.g. the sample side of the optical interface) relative to a plane (e.g., relative to a focal plane of a microscope) (e.g., due to roughness and/or bowing) is no more than about a depth of focus of a microscope with which the optical interface is intended to be used (e.g., after the sample dish comprising the substantially planar optical interface is mounted on the microscope). Without wishing to be bound by any particular theory, depth of focus of a microscope is generally linked to resolving power of the microscope. For example, for microscopes suitable for tissue imaging at a cellular or sub-cellular level, depth of focus may be, for example, no more than 60 micrometers, no more than 30 micrometers, no more than 10 micrometers, no more than 5 micrometers, or no more than 2 micrometers. In certain embodiments, natural variation in height of a surface of an optical interface relative to a plane is no more than 120% (e.g., no more than 110%, no more than 105% or no more than 100%) of a depth of focus of a microscope with which the optical interface is intended to be used (e.g., no more than 75 micrometers, no more than 60 micrometers, no more than 30 micrometers, no more than 10 micrometers, no more than 5 micrometers, or no more than 2 micrometers). In some embodiments, a sample dish comprises a substantially planar optical interface when the optical interface is mounted on a microscope.

In certain embodiments, an optical interface has a very low water absorption rate (e.g., comprises a material with a very low water absorption rate). For example, in certain embodiments, an optical interface has a relative mass variation of no more than 0.1% (e.g., no more than 0.01%) using an ASTM International D570 test (e.g., a 24 hour test). As used herein, a "relative mass variation" upper bound on a mass increase of a sample (e.g., an optical interface) at the end of an immersion test (e.g., an ASTM International D570 test) that is reported as a percentage of an initial mass of the sample prior to the immersion test. For example, a sample with an initial mass of 100 g that absorbs 2 g of water during a test has a relative mass variation of 2%. A low water absorption rate (e.g., a relative mass variation of no more than 0.1%) can reduce deformation (e.g., reduction in planarity due to, for example, swelling) that occurs from contact of the optical interface with biological fluids during imaging.

In certain embodiments, a sample dish is disposable and may be package in a set of disposable sample dishes. In certain embodiments, a set of sample dishes comprises a plurality of sterile or non-sterile, disposable, single-use sample dishes. A set of sample dishes may correspond to a set of sample dishes sold as a set for use with a microscope. A set of sample dishes may correspond to a manufacturing batch (e.g., a manufacturing run) or a subset of a manufacturing batch (e.g., intended for individual sale or sale as a set comprising a portion or all of a manufacturing batch). High degrees of uniformity between sample dishes in a set may reduce imaging time for intraoperative microscopy by reducing or eliminating the need to alter optical properties of a microscope to accommodate variation between sample dishes in a set. For example, highly uniform optical interface thickness between sample dishes in a set may reduce or eliminate the need to adjust position of a focal plane of a microscope when changing sample dishes. Allowing a focal plane to remain fixed or limited to a particular fixed range may reduce intraoperative imaging time.

In certain embodiments, for each of a plurality of sample dishes in a set of sample dishes, the thickness of the optical interface may be within 30 µm of a standardized thickness (i.e., no more than 30 µm thicker or thinner than the standardized thickness and inclusive of the limits of the range). For example, an optical interface thickness may be within 20 µm, within 10 µm, within 5 µm, within 4 µm, within 3 µm, within 2 µm, or within 1 µm of a standardized thickness. For example, a set of sample dishes may be provided with a standardized thickness of 50 µm and each sample dishes in the set may have a thickness of no less than 48 μm and no more than 52 μm. In certain embodiments, a standardized thickness is between 5 μm and 500 μm. For example, a standardized thickness may be between 10 μm and 250 μm, between 10 μm and 100 μm, between 25 μm and 75 μm, between 40 μm and 60 μm, or between 45 μm and 55 μm. In certain embodiments, a standardized thickness is about 50 μm. A standardized thickness may selected based at least in part on, for example, one or more of a particular model with which a sample dish is to be used and a particular sample type to be imaged using a sample dish. In certain embodiments, a set of sample dishes comprises a plurality of sample dishes comprising at least 20 sample dishes. For example, a plurality of sample dishes in a set may comprise at least 30, at least 40, at least 50, or at least 60 sample dishes.

A set of sample dishes sold to be used with a microscope may be individually packaged. A set of sample dishes may comprise secondary (and, optionally tertiary packaging) such that a set of sample dishes may be easily divided (e.g., for use in multiple surgical procedures or multiple operating rooms) after being purchased while remaining packaged. For example, each sample dish in a set may be individually packaged, with five individually packaged dishes packaged into a superset, and four supersets packaged by tertiary packaging into a set for sale. A set of sample dishes may be not individually packaged while being packaged as a set.

An optical interface may comprise at least one of glass, sapphire, and imaging grade plastic. As used herein, an imaging grade plastic is a plastic material that has one or more of (i) high transparency (e.g., having greater than 80%, greater than 90%, or greater than 95% transparency), (ii) a uniform refractive index distribution (e.g., varying no more than 20%, no more 10%, or no more than 5% over at least one dimension of an optical interface), (iii) no birefringence and (iv) a low surface roughness. In some embodiments, an imaging grade plastic is suitable for high-resolution imaging (e.g., imaging at a micrometer or sub-micrometer resolution) is possible through an imaging grade plastic. For example, an imaging grade plastic may comprise or consist essentially of one or more of polycarbonate (PC), polystyrene (PS), and a cyclo olefin polymer (COP) (e.g., a cyclo olefin copolymer). An optical interface may comprise a single uniform layer, a single layer with spatially variable properties, or multiple layers (e.g., a multi-layer stack comprising a plurality of imaging grade plastics). In certain embodiments, an optical interface comprises plastic surrounding a glass window. For example, in certain embodiments, an optical interface comprises imaging grade plastic that surrounds a glass window.

In certain embodiments, an optical interface consists essentially of imaging grade plastic. In some embodiments, an optical interface consists essentially of glass. In some embodiments, an optical interface comprises an imaging-grade plastic disposed (e.g., coated) over a glass window [e.g., consists essentially of an imaging-grade plastic disposed (e.g., coated) over a glass window]. Imaging grade plastic may be less expensive to use as an optical interface material than glass. Without wishing to be bound to any particular theory, use of imaging grade plastic in an optical interface may reduce risks of injury (e.g., resulting from breakage) and/or contamination. In some embodiments, the risk of breakage of a thin optical interface consisting essentially of glass with large lateral dimensions is significant. Therefore, in some embodiments, an optical interface consisting essentially of imaging-grade plastic that is less susceptible to breaking is used.

For use in imaging, a sample dish is mounted to a microscope (e.g., on or over an imaging window of the microscope). A sample dish may be mounted on a microscope by contacting at least one of an optical interface and a support member of the sample dish to the microscope on or around the imaging window. For example, in some embodiments, a sample dish has an optical interface (and/or support member) that corresponds in shape and size to a mounting surface of a microscope (e.g., wherein the mounting surface comprises an imaging window) such that the optical interface (and/or support member) of the sample dish contacts the mounting surface. A user may mount a sample dish by placing it on a mounting surface. In certain embodiments, a sample dish only contacts a microscope (e.g., at an imaging window) when the sample dish is mounted on the imaging window. For example, a sample dish may be sized and shaped to sit flush against a specially shaped portion of a mounting surface of a microscope.

In certain embodiments, an imaging window is a transparent imaging window that is transparent to at least to any wavelength(s) used (e.g., provided or detected) by a microscope. For example, an imaging window may be transparent to the visible wavelengths (i.e., the wavelengths which are visible to humans). In certain embodiments, an optical interface of a sample dish is a transparent optical interface that is transparent to at least to any wavelength(s) used (e.g., provided or detected) by a microscope with which the sample dish is used. For example, an optical interface may be transparent to the visible wavelengths (i.e., the wavelengths which are visible to humans).

In certain embodiments, only an optical interface of a sample dish contacts a microscope when the sample dish is mounted on the microscope. Mounting a sample dish to a microscope by contacting only an optical interface of the sample dish to the microscope may minimize the influence of planarity of the periphery of the sample dish. In certain embodiments, an optical interface of a sample dish is flexible (e.g., due, at least in part, to the thickness and/or a material of the optical interface). A flexible optical interface of a sample dish may be conformable to an imaging window of a microscope such that a mounting side of the optical interface conforms to the imaging window when the sample dish is mounted. As such, an air layer, which may form when the sample dish is initially placed on the imaging window, disappears as the optical interface conforms to the imaging window thereby directly contacting the optical interface to the imaging window over a certain area (e.g., the entire area of the imaging window). Without wishing to be bound to any particular theory, direct contact between an optical interface and an imaging window can reduce imaging artifacts that otherwise result from an air layer between the optical interface and the imaging window.

In some embodiments, an optical interface is flexible such that the optical interface conforms to an imaging window of a microscope such that the imaging window and the optical interface are in direct contact over an area (e.g., an entire surface of an imaging window) when the sample dish is mounted on the microscope. In some embodiments, a flexible optical interface has sample surface with an area corresponding to a field of view (e.g., of at least 600 mm$^2$, at least 900 mm$^2$, at least 1200 mm$^2$, at least 1500 mm$^2$, or at least 1700 mm$^2$) that varies in height (i.e., relative to a plane) by less than 10 μm (e.g., less than 7 less than 5 or less than 3 μm) when the sample dish is mounted on a microscope (e.g., due, at least in part, to the optical interface conforming to an imaging window of the microscope).

A sample dish mounted on a microscope (e.g., on or over an imaging window of the microscope) may assist in protecting the microscope from direct contact and, hence, contamination with tissue sample (i.e., by disposing a barrier between a sample and a microscope). A sterile sample dish may also form a sterile barrier protecting a sterile scrub suited user (e.g., a surgeon) from entering in contact with a non-sterile microscope. For example, a sterile sample dish may achieve this in combination with a sterile drape placed over a microscope, but with an opening over an imaging window of the microscope.

In certain embodiments, a sample dish comprises one or more manipulation elements attached to the support member of the sample dish that facilitate handling of the sample dish such as during mounting, positioning, and/or dismounting of the sample dish. A manipulation element may be a tab or other similar protrusion, such as a flap or handle that protrudes from a support member. A manipulation element may be large enough to be grasped by a user's hand. A manipulation element may alternatively or additionally be grasped by a tool such as tweezers or forceps. A plurality of manipulation elements may be symmetrically (e.g., equally) distributed around an optical interface. In certain embodiments, a sample dish comprises two manipulation elements disposed on opposite sides of the sample dish (e.g., wherein the two manipulation elements are each a portion of the support member).

In certain embodiments, a sample dish comprises an optical interface and a support member that comprises a ditch that surrounds a periphery of the optical interface. Liquid on the optical surface can drain into the ditch. A ditch inhibits liquids from overflowing a sample dish (e.g., during handling). In certain embodiments, a support member of a sample dish comprises a plurality of separation ribs (e.g., evenly spaced separation ribs) disposed at least partially within a ditch such that the plurality of separation ribs partition the ditch. Partitioning a ditch of a sample dish using separation ribs inhibits liquid from accumulating in a particular location of the ditch and, thus, reduces the risk of overflowing. For example, when a sample dish is unmounted from a microscope after an imaging session, a ditch and/or partitions that partition the ditch may prevent or minimize overflowing (e.g., as a result of tilting) as the sample dish is transported to a disposal bin. A plurality of separation ribs of a support member may be disposed such that they are oriented radially relative to a center of an optical interface of the sample dish.

In certain embodiments, a support member of a sample dish comprises a ditch comprising an outer lip and an inner lip with an optical interface of the sample dish disposed above the inner lip of the support member. In some embodiments, a ditch is at least 3 mm deep [e.g., at least 4 mm, at least 5 mm, at least 6 mm, at least 7 mm, or at least 10 mm deep (e.g., between 4 mm and 10 mm, between 6 mm and 10 mm, or between 4 mm and 7 mm deep)]. In some embodiments, a ditch of a sample dish can contain at least 1 mL of fluid [e.g., at least 3 mL, at least 5 mL, least 7 mL, at least 8 mL, at least 10 mL, or at least 15 mL of fluid (e.g., between 7 mL and 15 mL, between 8 mL and 12 mL, or about 10 mL of fluid)] (e.g., without any fluid being on an optical interface of the sample dish). The optical interface may be attached to the support member by a portion of the inner lip. In certain embodiments, the optical interface is also disposed above an outer lip of a ditch (e.g., when the sample dish is mounted on a microscope). In some embodiments, a sample dish with an optical interface disposed above both an inner lip and outer lip of a ditch (e.g., above the entire ditch) maximizes lateral access to the optical interface (e.g., by a tool or hand of a user). In some embodiments, having an optical interface disposed entirely above a ditch mitigates the impact of the ditch on the ability of tools to position a sample on an optical interface prior to and/or during imaging. In some embodiments, an outer lip of a ditch extends above an optical interface of a sample dish (e.g., such that a ditch can be used to contain fluid that at least partially immerse a sample disposed on the optical interface).

In certain embodiments, a sample dish is a one-part component (e.g., that does not require assembly prior to use). For example, a sample dish is injection molded in a single molding step and optionally finished by, for example, polishing at least a portion of the dish. In certain embodiments, a support member (e.g., and also one or more manipulation elements) is a one-part component (e.g., that does not require assembly prior to use) that is attached (e.g., glued or welded) to a transparent optical interface. For example, all portions of a sample dish except for a transparent optical interface may be injection molded in a single molding step (and optionally finished) and then attached (e.g., glued or welded) to a transparent optical interface. A reduced number of pieces can simplify manufacturing (both in time and cost) as well as reduce sample preparation time during imaging (e.g., because the dish does not need to be assembled in any way prior to imaging).

In certain embodiments, an imaging system comprises a transparent imaging window and a window support that supports the transparent imaging window. The window support may comprise one or more tapered edges. One or more tapered edges may have an advantage, in certain embodiments, in that they allow a sample dish mounted thereon to be self-centering. One or more tapered edges may be tapered such that they taper outward (e.g., from a transparent imaging window). For example, a window support may be shaped like a frustum (e.g., a frustum with a hollow channel). An example of a tapered edge of a window support that tapers outward is shown in FIGS. 4A-4B and 7A-7B. In some embodiments, if a sample dish is self-centering to a centered position in that if it is placed slightly off-center (e.g., within 3 cm, within 2 cm, or within 1 cm of the centered position), the dish will slide into its natural centered position. A sample dish may be slightly tilted when initially placed off-center. For example, there may initially be a gap between an optical interface of a sample dish and a transparent imaging window that is eliminating when the dish self-centers. In some embodiments, a window support provides self-centering functionality for a sample dish with or without a sample pre-disposed thereon. For example, in some embodiments, a sample dish placed slightly off-center will self-center and then a sample is disposed on a sample surface of the dish (e.g., a sample surface of an optical interface).

Without wishing to be bound to any particular theory, a window support may be self-centering at least in part due to a low coefficient of friction between a sample dish and a window support that facilitates sliding. For example, in some embodiments, a window support, or at least one or more tapered edges thereof, comprises or is made from a metal, such as a polished metal. For example, a window support, or at least one or more tapered edges thereof, may comprise or be made from polished aluminum. In certain embodiments, a tapered edge of a window support has a surface roughness (Ra) of no more than 5 micrometers, no more than 3 micrometers, no more than 2 micrometers, or no more than 1 micrometer. In some embodiments, the surface roughness (Ra) is no more than 1 micrometer.

In some embodiments, a sample dish is sized and shaped to be self-centering. For example, a sample dish may comprise a support member (e.g., a ditch-shaped support member) with an inner lip and an outer lip, wherein the inner lip is closer to an optical interface of the sample dish than the outer lip (e.g., is closer to a tapered edge of a window support of an imaging system when the sample dish is mounted on the imaging system). The inner lip may be sloped outward away from the center of the sample dish (e.g., in order to align, at least partially, with a tapered edge of a window support). In some embodiments, an inner perimeter of a has a characteristic dimension (e.g., diameter) approximately equal in size and shape to an upper surface of a window support so that when a sample dish is mounted on an imaging system, the sample dish naturally fits snuggly over the window support in a centered position. In some embodiments, such a sizing and shaping of a sample dish assists in the sample dish self-centering to a centered position if initially placed slightly off-center (e.g., within 3 cm, within 2 cm, or within 1 cm of a centered position). In some embodiments, only an outer surface of an inner lip is sloped. A sloped support member (e.g., a sloped inner lip) may be sloped outward and, optionally, may have a constant slope.

A support member may be made from injection molded plastic. For example, a support member may be made from cyclo-olefin polymer (COP). In some embodiments, a support member or portion thereof (e.g., an outer surface of an inner lip) has a surface roughness (Ra) of no more than 6 micrometers, no more than 4 micrometers, no more than 3 micrometers, or no more than 2.5 micrometers. In some embodiments, the surface roughness (Ra) is no more than 3 micrometers. A low surface roughness can result from using a mold with low surface roughness when injection molding, for example. A low surface roughness of a sample dish (e.g., a support member) can help reduce a coefficient of friction between a sample dish and a window support, for example if a window support comprises a tapered edge made of polished metal.

Referring to FIG. 1, illustrative sample dish 100 comprises circular optical interface 102 and ring-shaped support member 104 that surrounds optical interface 102. Support member 104 comprises manipulation elements 106a-b and ditch 110 comprising inner lip 110a and outer lip 110b, and separation ribs 108. Optical interface 102 consists essentially of imaging grade plastic. Separation ribs 108 are disposed evenly around ditch 110 and are oriented radially relative to a center of circular optical interface 102. Manipulation elements 106a-b are evenly space tabs that are each a portion of support member 104. Manipulation elements 106a-b can be grasped by a user's hands when handling sample dish 100. Optical interface 102 is attached [e.g., glued, heat sealed, or welded (e.g., laser welded)] to support member 104 on a portion of inner lip 110a of ditch 110. Optical interface 102 is disposed above inner lip 110a and outer lip 110b. In some embodiments, in contrast to illustrative sample dish 100, an outer lip extends above the sample surface of an optical interface of a sample dish (e.g., such that a ditch can be used to contain fluid on the sample dish that at least partially immerses a sample disposed on the sample dish).

Figure 2:
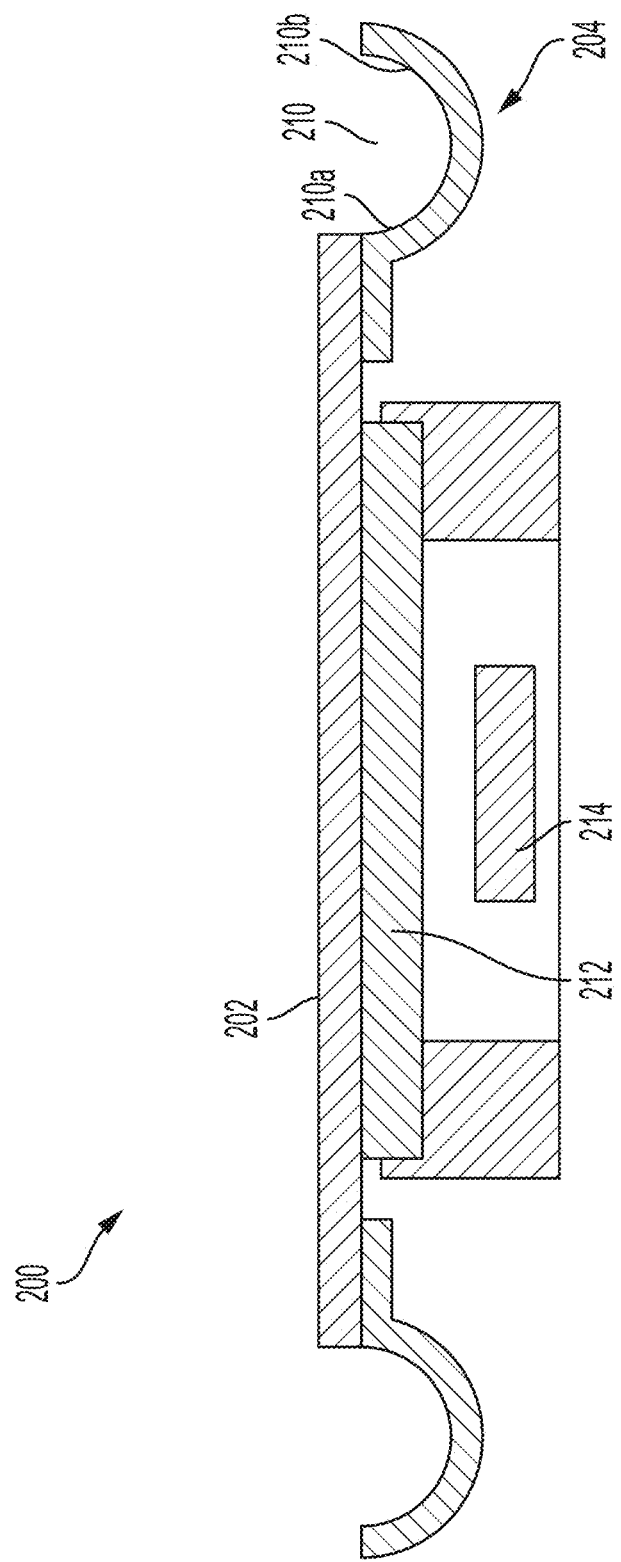
FIG. 2 shows a side view of an illustrative sample dish mounted onto a microscope, according to illustrative embodiments of the invention.

FIG. 2 is a cross section of illustrative sample dish 200 mounted onto a microscope and directly contacting imaging window 212. Illustrative sample dish 200 comprises optical interface 202 and support member 204. Support member 204 comprises ditch 210 with inner lip 210a and outer lip 210b. Support member 204 does not comprise separation ribs. Optical interface 202 is attached to support member 204. Optical interface 202 has a sample side and a mounting side opposite the sample side. The mounting side of illustrative sample dish 200 is mounted onto a microscope and in direct contact with imaging window 212 thereof. Optical interface 202 directly contacts imaging window 212. Microscope optics 214 (e.g., comprising an array of micro-optical elements) are disposed below imaging window 212 and is used to scan a sample during imaging. Illustrative sample dish 200 provides an additional barrier between a sample disposed on the sample side of optical interface 202 and microscope optics 214 to protect the microscope from direct contact with and, hence, contamination by a sample (e.g., tissue sample) during imaging. When a sample is disposed on the sample side of optical interface 202, imaging comprises electromagnetic radiation propagating through microscope optics 214, imaging window 212, and optical interface 202 in order to interact with a sample disposed on the sample side of optical interface 202. Illustrative sample dish 200 is mounted to imaging window 212 by only contacting optical interface 202 to the microscope comprising imaging window 212 and microscope optics 214 (i.e., support member 204 does not contact the microscope).

Figure 11:
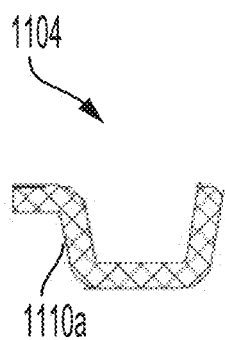
FIG. 11 is a schematic of a portion of a support member of a sample dish with an outward sloped inner lip, according to illustrative embodiments of the invention.

FIG. 11 shows a portion of a support member 1104 of an illustrative sample dish, where support member 1104 has an outward sloped inner lip 1110a. The sloped inner lip may assist in the sample dish self-centering during mounting, for example. Such a sloped inner lip or a similarly sloped support member may be used in combination with any other feature disclosed herein (e.g., as shown and described in reference to other figures) in an example sample dish. The slopped inner lip may have a low surface roughness ($R_a$), for example less 3 micrometers.

Figure 3:
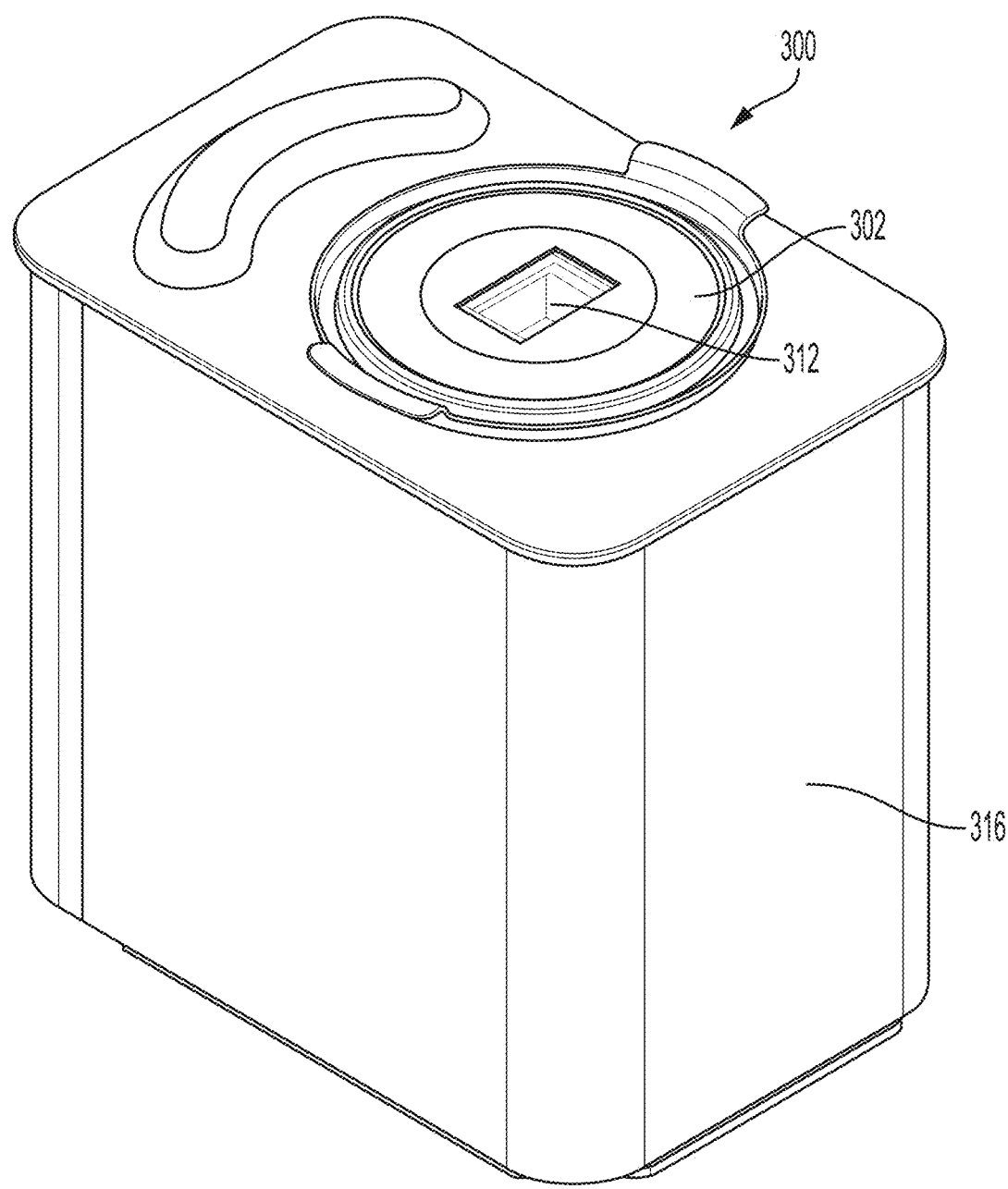
FIG. 3 shows an illustrative sample dish mounted onto a microscope, according to illustrative embodiments of the invention.

FIG. 3 shows illustrative sample dish 300 mounted onto microscope 316. Optical interface 302 is much larger than imaging window 312, which allows for the entire field of view of imaging window 312 to be used during imaging. Illustrative sample dish 300, in accordance with some embodiments, fits onto a surface of microscope 316 such that support member 304 and optical interface 302 both contact microscope 316 when illustrative sample dish 300 is mounted on microscope 316. In some embodiments, only an optical interface of a sample dish contacts a microscope when the sample dish is mounted thereon (i.e., a support member of the sample dish does not contact the microscope).

Figure 4A:
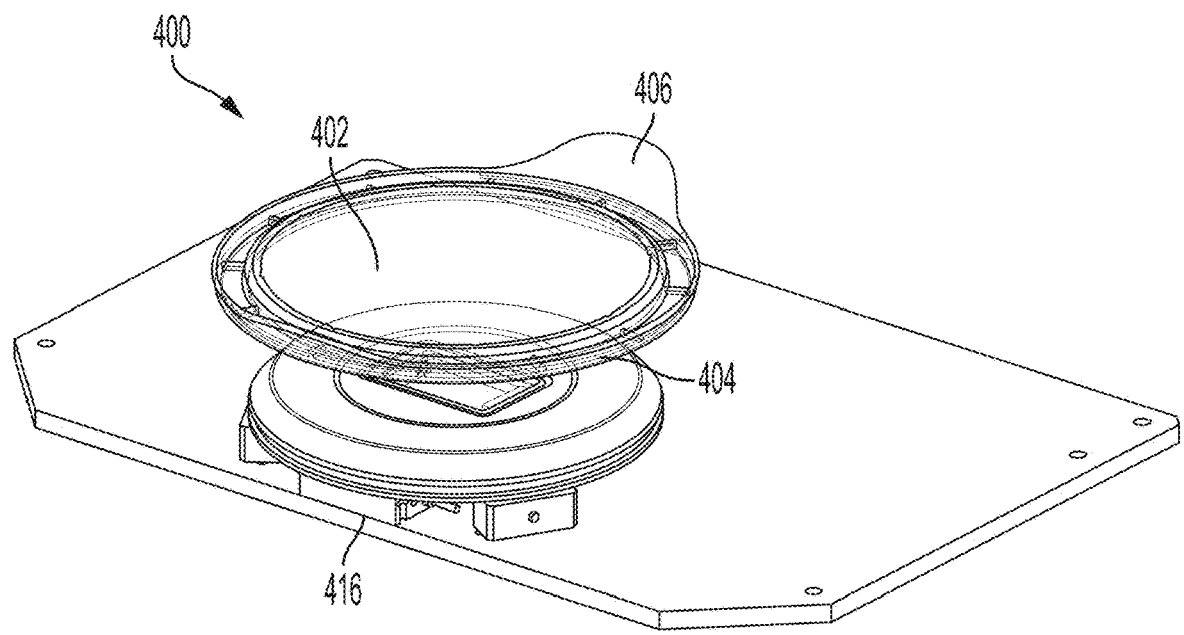
FIG. 4A shows an illustrative sample dish being mounted onto a microscope, according to illustrative embodiments of the invention.
Figure 4B:
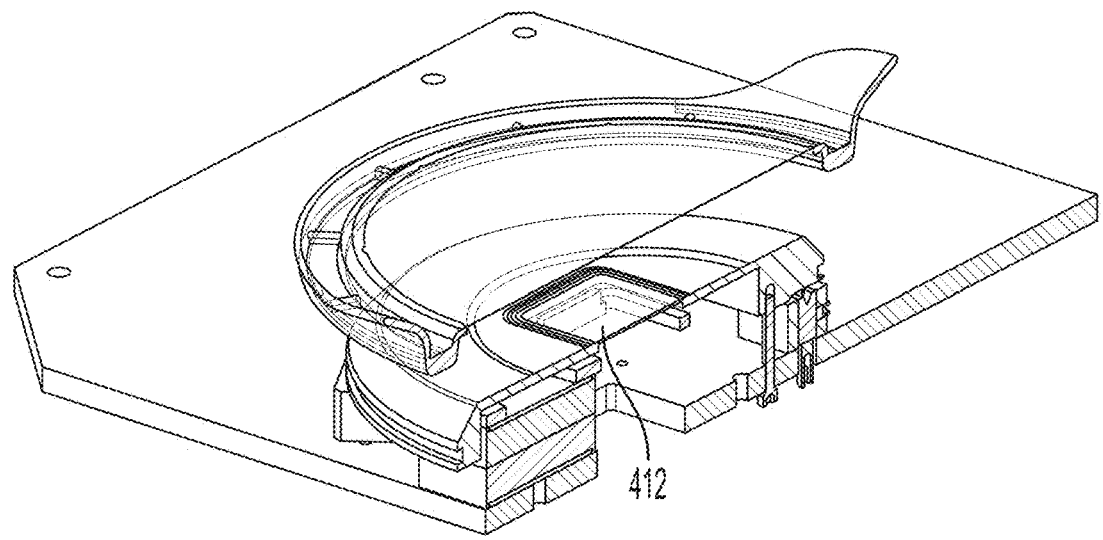
FIG. 4B shows a cross-sectional view of FIG. 4A.

FIG. 4A shows illustrative sample dish 400 above microscope 416 in the process of mounting illustrative sample dish 400 to microscope 416. FIG. 4B shows a cross-sectional cutaway of FIG. 4A. FIG. 4B shows that optical interface 402 is much larger than a field of view of imaging window 412. Support member 404 comprises separation ribs and protrudes to form manipulation elements 406. A sample may be repositioned or reoriented while on illustrative sample dish 400 in order to image additional areas and/or volumes of the sample, but illustrative sample dish 400 remains fixed (i.e., does not move) during imaging since the dish is larger than the field of view of imaging window 412. Illustrative sample dish 400 is sized and shaped such that only optical interface 402 contacts microscope 416 when illustrative sample dish 400 is mounted on microscope 416.

Figure 5:
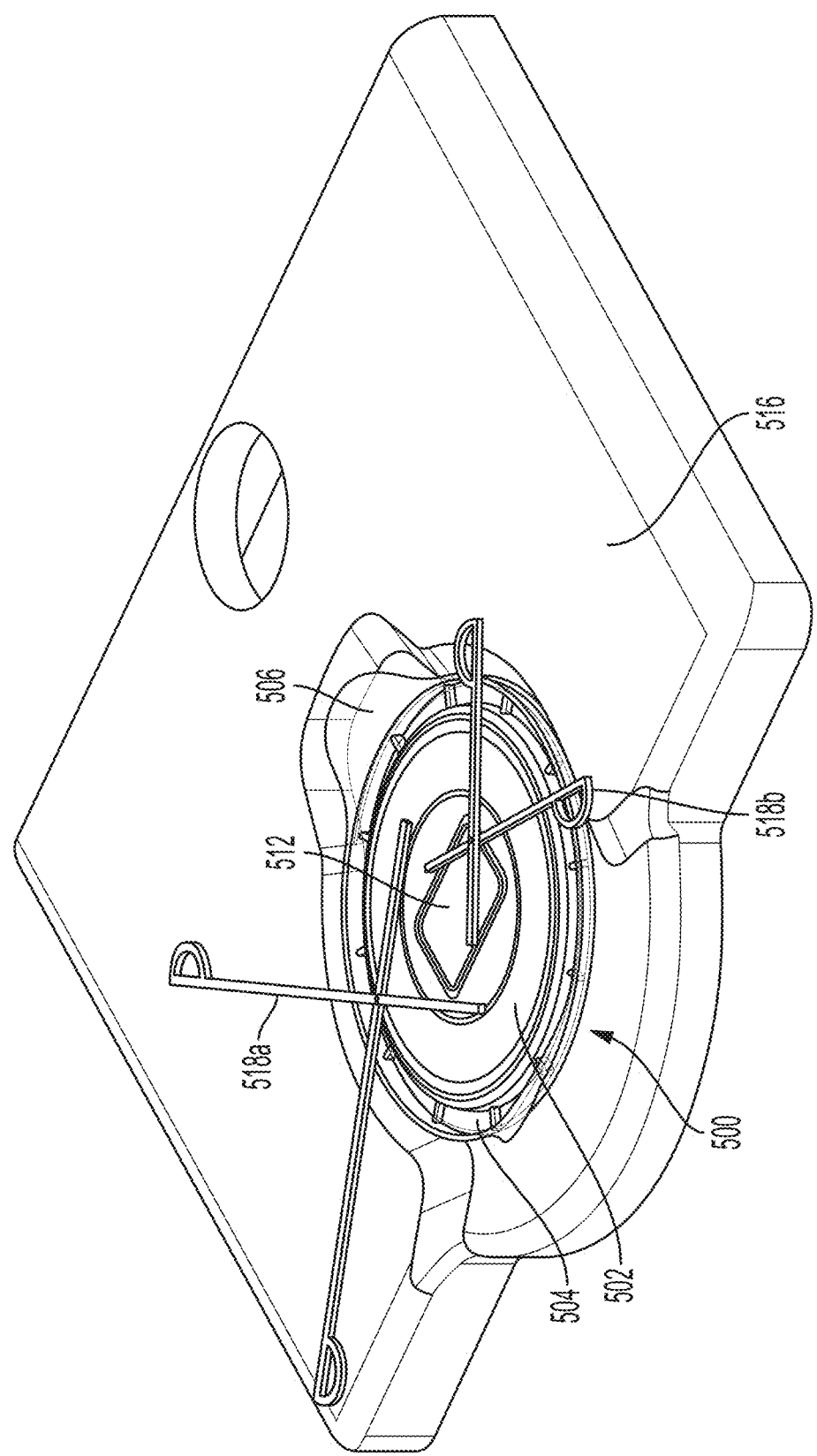
FIG. 5 shows an illustrative sample dish mounted onto a microscope with forceps present to manipulate (e.g., position) a tissue sample, according to illustrative embodiments of the invention.

FIG. 5 shows illustrative sample dish 500 mounted on microscope 516 (e.g., by using manipulation element 506 to position the dish). Optical interface 502 is disposed above both the inner lip and outer lip of the ditch of support member 504 to provide unobstructed lateral access to the tissue sample. Microscope 516 is configured such that illustrative sample dish 500 sits in a recessed portion of the microscope. Since optical interface 502 is disposed above support member 504, forceps 518*a-b* can readily be used to position a sample disposed on a sample surface of optical interface 502 (i.e., above imaging window 512). Illustrative sample dish 500 comprises an optical interface 502 that has a sample side exposed to a user of microscope 516 such that the user can use forceps 518*a-b* can be used to position and/or orient a sample. Moreover, forceps 518*a-b* can remain in a desired position while imaging the sample due to the exposed sample side.

Figure 6:
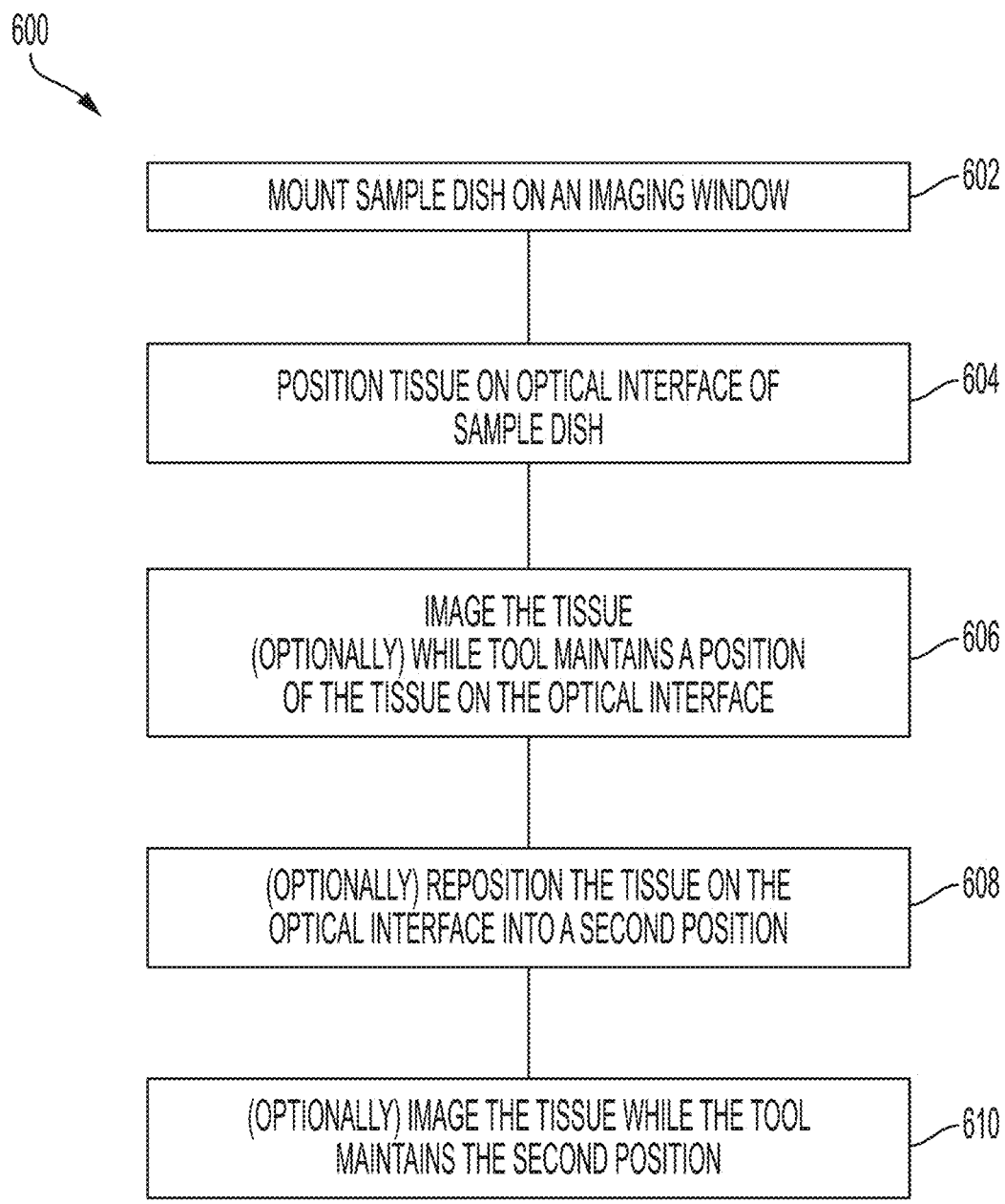
FIG. 6 is a block diagram of an illustrative method for using a sample dish in accordance with embodiments disclosed herein, according to illustrative embodiments of the invention.

FIG. 6 is a block diagram of illustrative method 600 for using a sample dish during imaging in accordance with certain embodiments of the present disclosure. A sample dish is mounted onto a microscope in step 602. The sample dish has an exposed sample surface when mounted on the microscope. In certain embodiments, step 602 comprises placing the sample dish on the microscope such that an optical interface of the sample dish conforms to the imaging window (e.g., when the optical interface is flexible). A user may wait for a brief period of time to allow any air gap between the optical interface and imaging window to be eliminated as the optical interface conforms to the imaging window. Tissue is positioned on the optical interface of the sample dish in step 604. Tissue may be any tissue of interest (e.g., of interest in a surgical procedure, such as a resected tissue sample to be imaged intraoperatively). A tool, such as standard surgical forceps, may optionally be used to position and/or orient the tissue on the sample surface of the optical interface of the sample dish in step 604. Alternatively or in addition, a user may use his or her hands to position the tissue on the sample surface of the optical interface.

In optional step 606, the tissue is imaged while the tool, maintains the position of the tissue on the optical interface. The tool may be used to maintain the position throughout imaging because the optical interface of the sample dish has an exposed sample surface and the support member of the sample dish does not interfere with access to the tissue on the sample surface of the optical interface. For example, in contrast, certain sample dishes with high walls inhibit the use of tools to position samples during imaging (e.g., by reducing or preventing lateral access to a sample). In some embodiments, a sample is stable after positioning and no tool is needed to maintain positioning during imaging.

In optional step 608, the tool may be used to reposition the tissue on the optical interface into a second position. In optional step 610, the sample is imaged again while the tool maintains the second position. In some embodiments, a sample is stable after repositioning (to the second position) and no tool is needed to maintain the second position during imaging. Due to the exposed sample surface of the optical interface of the sample dish in illustrative method 600, repositioning and subsequent imaging can happen rapidly. Illustrative method 600 provides a method for using a sample dish to perform microscopy (e.g., confocal scanning microscopy) that obtains images of portions of interest of a sample in a shorter period of time than can be realized with alternative sample holders due to simple sample dish mounting and sample positioning. For example, multiple (e.g., several or many) different region of interests of a tissue sample may be imaged (e.g., with different orientations, such as regions on opposite sides of the tissue sample) and the tissue sample thus needs to be repositioned at least once (e.g., several or many times) in order to image all of the regions of interest.

In certain embodiments, disposing a sample dish directly over a transparent imaging window of a microscope produces a thin layer of air between a transparent optical interface of the sample dish and the transparent imaging window. The thin layer of air may be, for example, about 10 micrometers in thickness. Direct contact between a sample dish and a transparent imaging window of a microscope may be difficult to achieve (i.e., a layer of air between the sample dish and the transparent imaging window may be unavoidable). Due to the high refractive index difference between a transparent optical interface of a sample dish, air, and a transparent imaging window of a microscope, reflections of an illumination beam of the microscope may be produced that introduce imaging artifacts (e.g., interference patterns) when imaging a sample, especially when the illumination beam has high coherence properties.

To mitigate imaging artifacts that may be introduced due to the presence of an air gap, in certain embodiments, a method of preparing to image a sample using a sample dish (e.g., one disclosed herein) comprises disposing an imaging artifact reducing fluid between a transparent optical interface of a sample dish and a transparent imaging window of a microscope. A microscope used in systems and methods disclosed herein may be a microscope (e.g., system) described in U.S. Provisional Patent Application No. 62/597,346, filed on Dec. 11, 2017 and entitled "Imaging Systems for Imaging Samples Using an Array of Micro Optical Elements and Methods of Their Use", the content of which is hereby incorporated by reference herein in its entirety. In certain embodiments, using a photon source in a microscope (e.g., as described in 62/597,346) with reduced temporal coherence (e.g., a light-emitting diode (LED) or super luminescent diode (SLED) instead of a laser) reduces imaging artifacts (e.g., interference patterns) between a sample dish and a transparent imaging window with or without also using an imaging artifact reducing fluid. A photon source with reduced temporal coherence can still have high spatial coherence.

As used herein, an imaging artifact reducing fluid is a fluid having a refractive index closer to at least one of a transparent imaging window and a transparent optical interface of a sample dish than the refractive index of air. An imaging artifact reducing fluid is transparent at least to any wavelength(s) used (e.g., provided or detected) by a microscope with which the imaging artifact reducing fluid is used. For example, an imaging artifact reducing fluid may be transparent to the visible wavelengths (i.e., the wavelengths which are visible to humans). An imaging artifact reducing fluid may be used to form a thin layer of approximately the same thickness as an air layer that would otherwise form absent the presence of the fluid. In certain embodiments, a microscope has a fixed focal plane engineered to lie near the surface of the sample side of a transparent optical interface of a sample dish. Therefore, the focal plane lies at or near the surface of a sample during imaging. In such embodiments, it is important that any imaging artifact reducing fluid have substantially uniform thickness between a transparent imaging window and a transparent optical interface of a sample dish. Generally, a non-uniform thickness may result in tilting of a sample dish that can degrade image quality (e.g., due to variable focus throughout the image). For example, a loss of sharpness and/or loss of intensity may result.

Using an imaging artifact reducing fluid can reduce the reflection coefficient at interfaces. For example, a sapphire-air interface (e.g., between a transparent imaging window and air) has a theoretical reflection coefficient of about 8%, while a plastic-air interface can have a theoretical reflection coefficient of about 4% (assuming n=1.51 for the plastic). By using water as an imaging artifact reducing fluid, these coefficients can be reduced. A sapphire-water interface has a reflection coefficient of about 2% and a plastic-water interface has a reflection coefficient of about 0.4% (assuming n=1.51 for the plastic). Without wishing to be bound by any particular theory, reducing the reflection coefficients of interfaces involving a transparent imaging window and transparent optical interface can reduce imaging artifacts such as interference patterns.

In certain embodiments, an imaging artifact reducing fluid has a substantially uniform thickness (e.g., is a layer with a substantially uniform thickness) between a transparent optical interface of a sample dish and a transparent imaging window. As used herein, a substantially uniform thickness of an imaging artifact reducing fluid over an area is a thickness that varies by no more than 20% of the average thickness of the fluid over the area (in some embodiments, no more than 10% or no more than 5%). A substantially uniform thickness contiguously over an area (e.g., of a transparent imaging window) means there are no visible air pockets or bubbles across the area that interfere with imaging. In certain embodiments, an imaging artifact reducing fluid has a substantially uniform thickness of no more than 30 micrometers. If the focal plane of a microscope is fixed, an offset of more than 30 micrometers produced by a relatively thick imaging artifact reducing fluid between a transparent window and a transparent optical interface may result in degraded image quality (due to a sample being out of focus). In certain embodiments, a substantially uniform thickness of an imaging artifact reducing fluid is about 10 micrometers (e.g., a thickness that is substantially equivalent to the thickness of the air layer that otherwise naturally forms).

A transparent imaging window may comprise (e.g., consist essentially of) sapphire (e.g., with a c-axis parallel to an optical axis of micro optical elements in an array of micro optical elements (e.g., of an optical chip), which accordingly does not exhibit birefringence effects). Sapphire is highly transparent to a broad spectrum, has a high Young's modulus in order to limit deflection under the load exerted by a sample, and is an impact resistant material and thus is suitable for use in a transparent imaging window for high resolution microscopy imaging. A transparent optical interface of a sample dish may comprise imaging grade plastic. In certain embodiments, a transparent imaging window has a refractive index that is higher than a refractive index of a transparent optical interface of a sample dish (e.g., wherein the refractive index of the transparent imaging window is at least 1.7 and the refractive index of the transparent optical interface is between 1.45 and 1.55). In certain embodiments, an imaging artifact reducing fluid has a refractive index between a refractive index of the transparent imaging window and a refractive index of the transparent optical interface of the sample dish. For example, an imaging artifact reducing fluid can be an oil such as an index matching oil.

In certain embodiments, a microscope is used for fast imaging of a sample such as intraoperative imaging of a resected tissue sample in an operating theater. Therefore, it may be desirable for an imaging artifact reducing fluid to be readily available, easy to clean, and/or suitable (e.g., sterile and/or purified) for use in an operating theater. In certain embodiments, an imaging artifact reducing fluid comprises (e.g., is) water (e.g., purified and/or de-ionized water). In certain embodiments, an imaging artifact reducing fluid is water (e.g., purified and/or de-ionized water). In certain embodiments, an imaging artifact reducing fluid is a saline solution. Saline (e.g., as used in a hospital) has a refractive index slightly closer to sapphire and optical grade plastic (generally about 1.5) than water alone and, therefore, without wishing to be bound by any particular theory, should reduce imaging artifacts (e.g., interference patterns) slightly more than water alone. In certain embodiments, an imaging artifact reducing fluid comprises isopropyl alcohol (e.g., is a solution of 60-80 wt % isopropyl alcohol in water).

Water (or saline) are useful as imaging artifact reducing fluids, for example in fast sample imaging applications (e.g., intraoperative imaging), as they can be cleaned from a transparent imaging window between samples without the need for using a solvent or extensive removal procedures (e.g., scrubbing or scraping). In certain embodiments, a transparent imaging window can be readied for use with a second sample by removing a sample dish from over the transparent imaging window and cleaning the transparent imaging window without using a solvent. For example, in certain embodiments, a transparent imaging window is cleaned by wiping, absorbing, or evaporating an imaging artifact reducing fluid from the transparent imaging window. Water and saline are easily wiped and/or absorbed.

In certain embodiments, an imaging artifact reducing fluid does not substantially evaporate from between a transparent imaging window and a transparent optical interface (e.g., such that the imaging artifact reducing fluid remains in a contiguous layer of a substantially uniform thickness over at least a portion of the transparent imaging window) for at least 15 minutes (e.g., at least 20 minutes, at least 30 minutes, or at least 45 minutes). A thickness of imaging artifact reducing fluid may decrease over time due to evaporation without substantially evaporating. Such temporal stability can allow full imaging of a sample to take place. For example, an intraoperative procedure may make use of a fast imaging microscope to completely image a sample over a period of time of less than 5 minutes, less than 10 minutes, less than 15 minutes, less than 20 minutes, or less than 30 minutes. An imaging artifact reducing fluid may remain in a substantially uniform thickness (e.g., albeit decreasing over time) during that period of intraoperative imaging. For example, water or saline are unlikely to appreciably evaporate over such time periods.

Figure 7A:
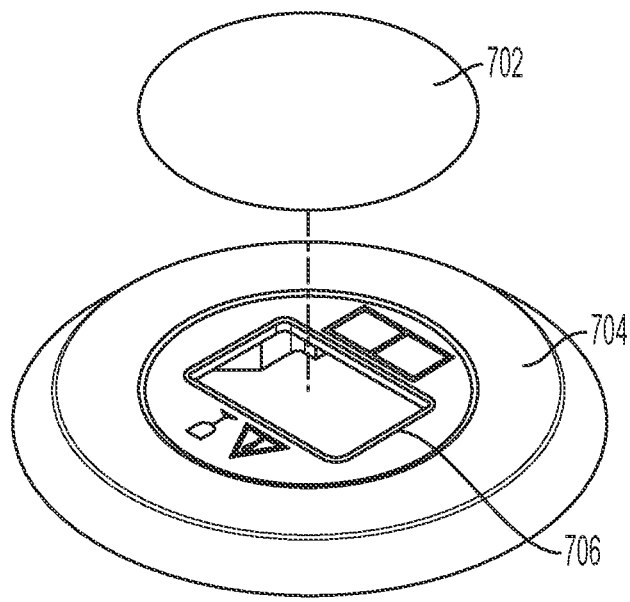
FIG. 7A shows a blow up of a portion of a microscope having an imaging window support and a transparent imaging window, according to illustrative embodiments of the invention.

FIG. 7A shows a blowup of a portion of a microscope. Transparent imaging window 702 is disposed over imaging window support 704 which comprises opening 706. Transparent imaging window 702 may be attached (e.g., glued) to imaging window support 704. Imaging window support 704 is part of a housing of the microscope. In certain embodiments, a transparent imaging window is disposed at least partially above the transparent imaging window support such that a surface of the transparent imaging window is more than 30 micrometers (e.g., at least 100 micrometers) above a surface of the transparent imaging window support. In some embodiments, a transparent imaging window support comprises an opening having an area no more than 50% larger (e.g., no more than 40% larger or no more than 25% larger) than a field of view of the microscope (e.g., over which the illumination beam may be scanned). In some embodiments, an imaging artifact reducing fluid is disposed on a transparent imaging window during imaging with a substantially uniform thickness over at least a portion of the transparent imaging window that is at least as large as the area of the opening. In some embodiments, a transparent imaging window has an aperture that has the area of the opening.

Figure 7B:
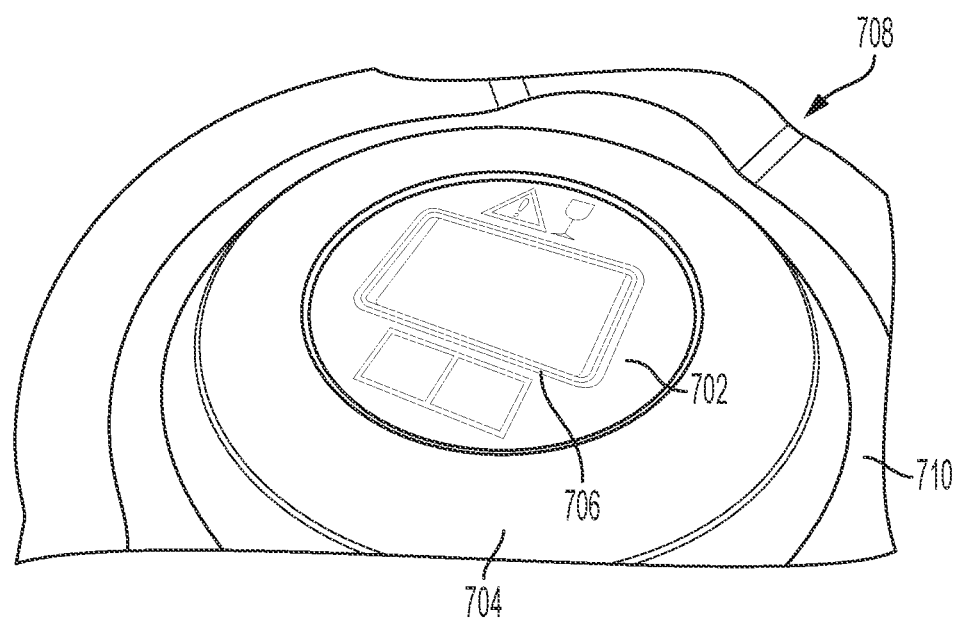
FIG. 7B is a view of a portion of a microscope, according to illustrative embodiments of the invention.

FIG. 7B is a view of a portion of an illustrative microscope. Housing 708 comprises imaging window support base 710 and imaging window support 704. Imaging window support 704 comprises opening 706. Transparent imaging window 702 is disposed on [e.g., attached (e.g., glued) to] imaging window support 704. In certain embodiments, an opening of an imaging window support is the same size (or substantially the same size) as a transparent imaging window. Imaging window support base 710, imaging window support 704, imaging window 702, and the rest of housing 708 form a waterproof seal that keeps any fluid away from (i.e., contains, at least in part) optics of the microscope, which are disposed below imaging window support 704). In some embodiments, a portion of an imaging artifact reducing fluid leaks from between a transparent imaging window and a transparent optical interface (e.g., thereby reducing its substantially uniform thickness) and is contained, at least in part, by an imaging window support base of a housing to which a transparent imaging window support is attached (e.g., wherein optics of the microscope are contained, at least in part, by the transparent imaging window support base of the housing such that the portion of the imaging artifact reducing fluid that has leaked cannot contact the optics).

Figure 8A:
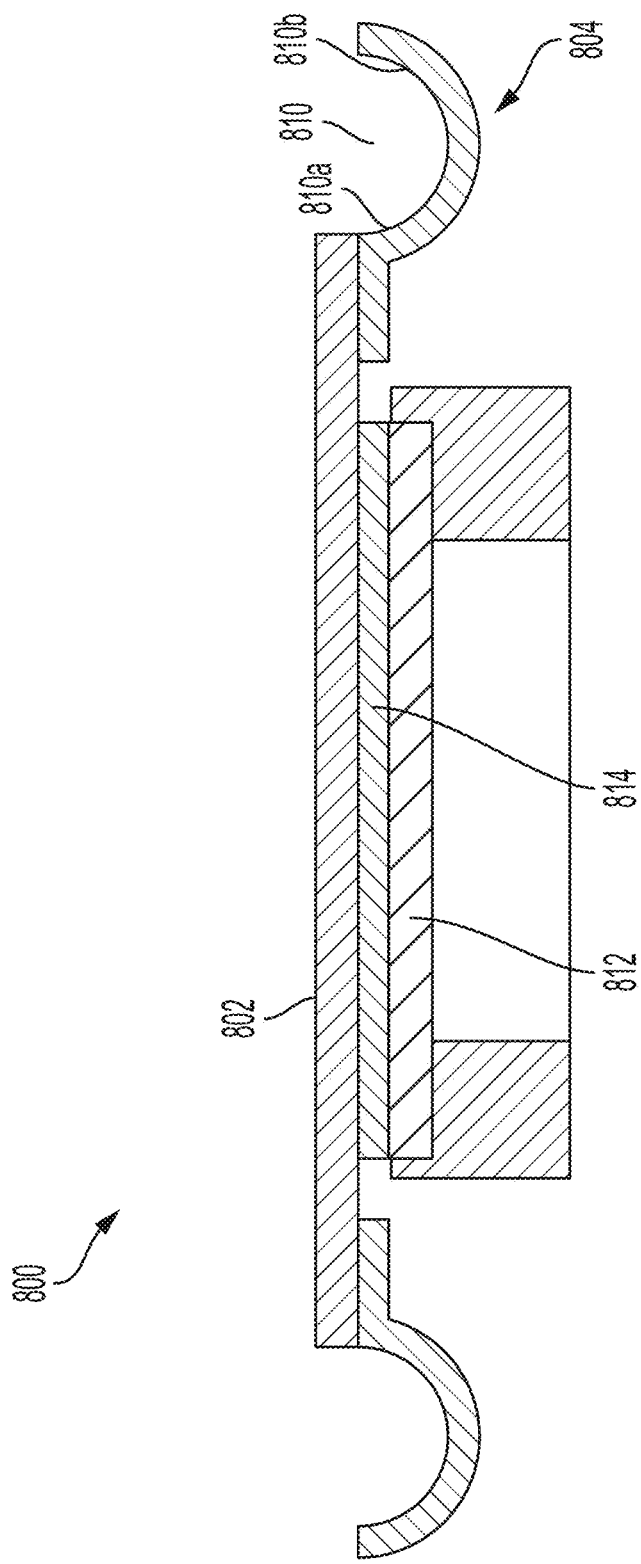
FIG. 8A is a cross-section of a microscope that has a sample dish disposed over a transparent imaging window with an image artifact reducing fluid between the sample dish and the transparent imaging window, according to illustrative embodiments of the invention.

FIG. 8A is a cross section of illustrative sample dish 800 disposed over a transparent imaging window 812 of a microscope. Illustrative sample dish 800 comprises optical interface 202 and support member 804. Support member 804 comprises ditch 810 with inner lip 810*a* and outer lip 810*b*. Support member 804 does not comprise separation ribs. Optical interface 802 is attached to support member 804. Optical interface 802 has a sample side and a mounting side opposite the sample side. The mounting side of illustrative sample dish 800 is in direct contact with imaging artifact reducing fluid 814 that is also in direct contact with an imaging window 812. Imaging artifact reducing fluid 814 is disposed between transparent optical interface 802 and transparent imaging window 812. As shown, imaging artifact reducing fluid 814 has a substantially uniform thickness contiguously over the entire area of transparent imaging window 812 (and over substantially all of, but not the entire area of, optical interface 802). Optical interface 802 directly contacts imaging window 812. Illustrative sample dish 800 provides an additional barrier between a sample disposed on the sample side of optical interface 802 and microscope optics (not shown) to protect the microscope from direct contact with and, hence, contamination by a sample (e.g., tissue sample) during imaging. When a sample is disposed on the sample side of optical interface 802, imaging comprises an illumination beam (e.g., electromagnetic radiation) propagating through microscope optics, imaging window 812, and optical interface 802 in order to interact with a sample disposed on the sample side of optical interface 802. Illustrative sample dish 800 is mounted to imaging window 812 by only contacting optical interface 802 through imaging artifact reducing fluid 814 to the microscope comprising imaging window 812 and microscope optics (i.e., support member 804 does not contact the microscope).

In certain embodiments, a transparent imaging window comprises (e.g., is coated with) an anti-reflection coated (e.g., permanently) on a surface of the transparent imaging window such that during imaging the anti-reflection coating is disposed between the transparent imaging window and an optical interface of a sample dish (e.g., is in contact with an imaging artifact reducing fluid). The anti-reflection coating may be engineered to reduce reflections caused by an illumination beam that has a normal (perpendicular) incidence angle to the transparent imaging window. In this way, an anti-reflection coating can reduce imaging artifacts (e.g., interference patterns) that would otherwise arise during imaging. A transparent imaging window comprising an anti-reflection coating may be used with or without an imaging artifact reducing fluid.

In certain embodiments, a transparent optical interface of a sample dish comprises an anti-reflection coating that is coated on a mounting side of the transparent optical interface such that during imaging the anti-reflection coating is disposed between the transparent optical interface and a transparent imaging window (e.g., is in contact with an imaging artifact reducing fluid). A transparent optical interface comprising an anti-reflection coating may be used with or without an imaging artifact reducing fluid. In certain embodiments, both a transparent imaging window and a transparent optical interface of a sample dish comprise anti-reflection coatings coated on respective surfaces (e.g., wherein the anti-reflection coatings are made of the same or different materials and/or structures). It may not be economical to include an anti-reflection coating on a transparent optical interface of a sample dish if the sample dish is disposable (e.g., due to cost). Therefore, in certain embodiments, it is preferable to use an anti-reflection coating on a surface of a transparent imaging window and an imaging artifact reducing fluid (i.e., without any anti-reflection coating on the sample dish).

Figure 8B:
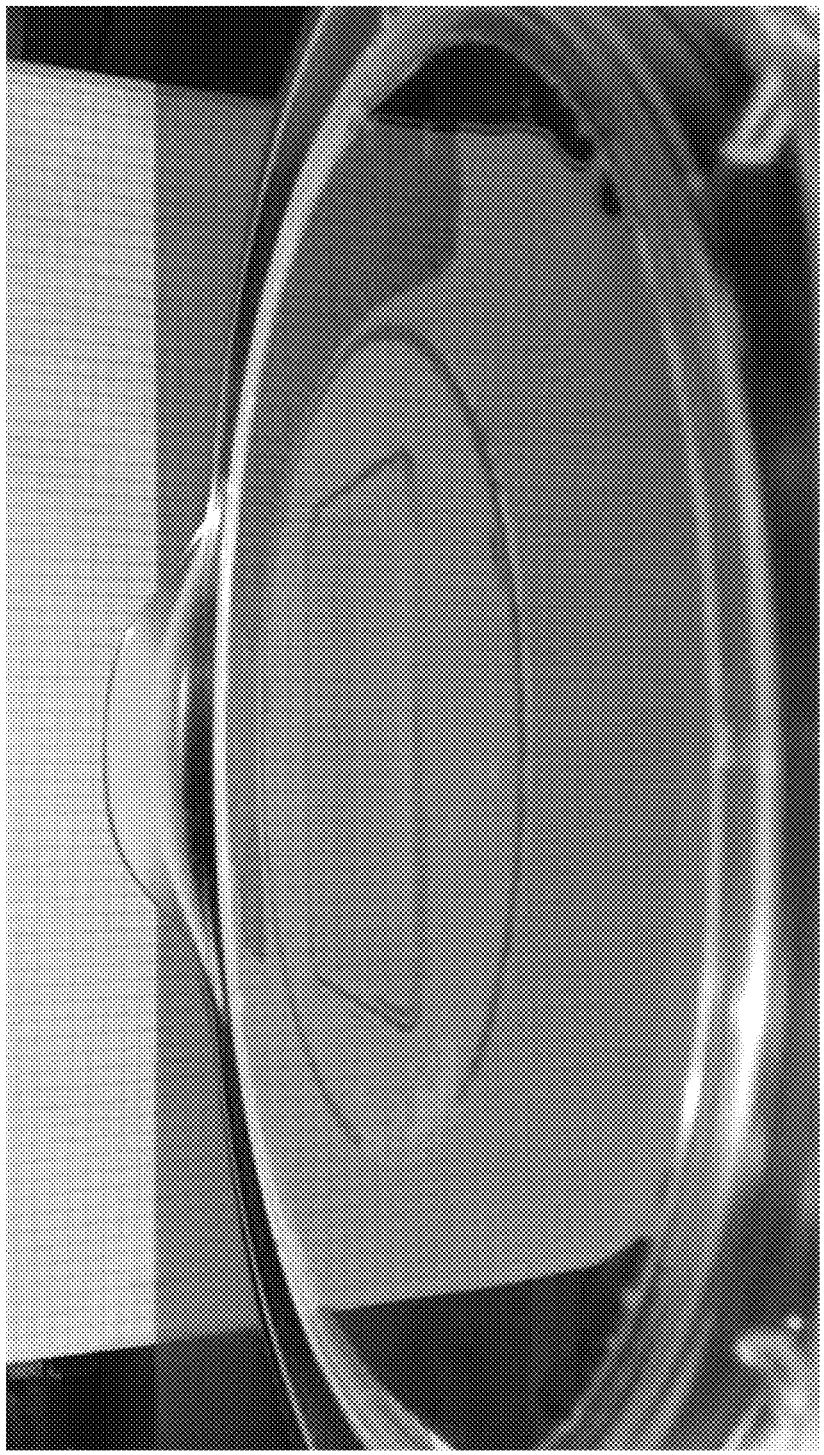
FIG. 8B is a photograph of an illustrative microscope corresponding to the cross-section of FIG. 8A, according to illustrative embodiments of the invention.

FIG. 8B is a photograph of an illustrative embodiment in which a sample dish is disposed over a transparent imaging window of a microscope. An imaging artifact reducing fluid is disposed between a transparent optical interface of the sample dish and the transparent imaging window. In certain embodiments, as shown in FIG. 8B, an imaging artifact reducing fluid has a substantially uniform thickness across the entire area (e.g., diameter) of a transparent imaging window [e.g., and the entire area (e.g., diameter) of a transparent optical interface of a sample dish]. In certain embodiments, as shown in FIG. 8B, a transparent imaging window and a sample dish are each circular. In certain embodiments, a transparent imaging window and a sample dish each have a diameter of at least 80 mm (e.g., about 100 mm). As an illustrative example, less than 100 µL of water can be used to form an imaging artifact reducing fluid having a substantially uniform thickness of approximately 10 micrometers over an entire area of a 100 mm diameter circular transparent imaging window and 100 mm sample dish.

Figure 9:
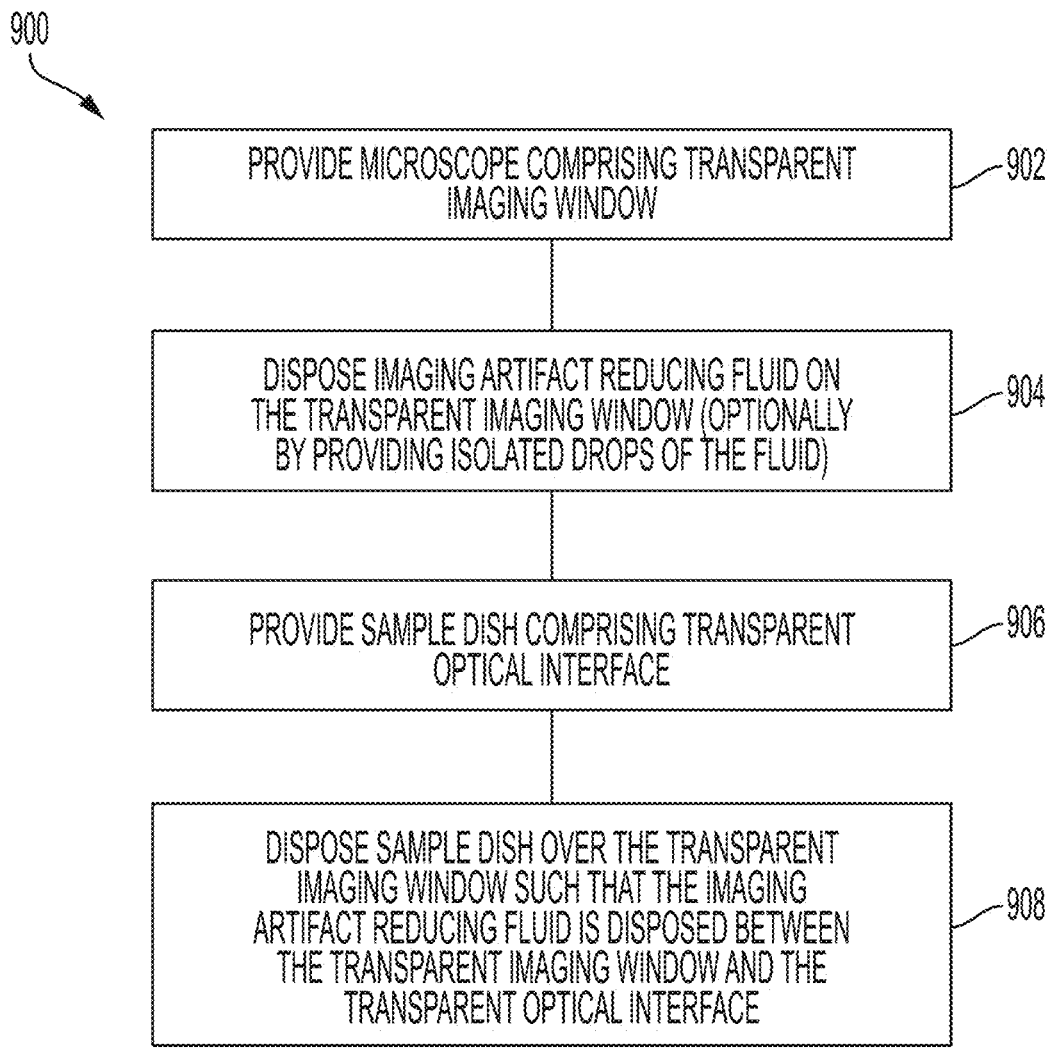
FIG. 9 is a block diagram of an illustrative method for preparing to image a sample using a sample dish and an imaging artifact reducing fluid, according to illustrative embodiments of the invention.

FIG. 9 is a block diagram of illustrative method 900. In step 902, a microscope comprising a transparent imaging window is provided. In step 904, an imaging artifact reducing fluid is disposed on the transparent imaging window (e.g., by providing a plurality of isolated drops of fluid, as discussed further below). In step 906, a sample dish comprising a transparent optical interface is provided. In step 908, the sample dish provided in step 906 is disposed over the transparent imaging window of the microscope provided in step 902 such that the imaging artifact reducing fluid disposed in step 904 is disposed between the transparent imaging window and the transparent optical interface and the imaging artifact reducing fluid has a substantially uniform thickness over at least a portion of the transparent imaging window (i.e., comprising the area of the transparent imaging window used during imaging). The imaging artifact reducing fluid may be in direct contact with the transparent imaging window and with the transparent optical interface after step 908.

In certain embodiments, the microscope comprises a housing which comprises an imaging window support and the transparent imaging window is disposed on [e.g., attached (e.g., glued) to] the transparent imaging window support such that an illumination beam provided by the microscope can pass from below the transparent imaging window support through at least a portion of the transparent imaging window when imaging the sample. In certain embodiments, an imaging artifact reducing fluid has a substantially uniform thickness contiguously over at least a portion of the transparent imaging window through which an illumination beam can pass when imaging a sample [e.g., over the entire transparent imaging window (optionally including areas of a transparent imaging window through which an illumination beam cannot pass)].

Figure 10:
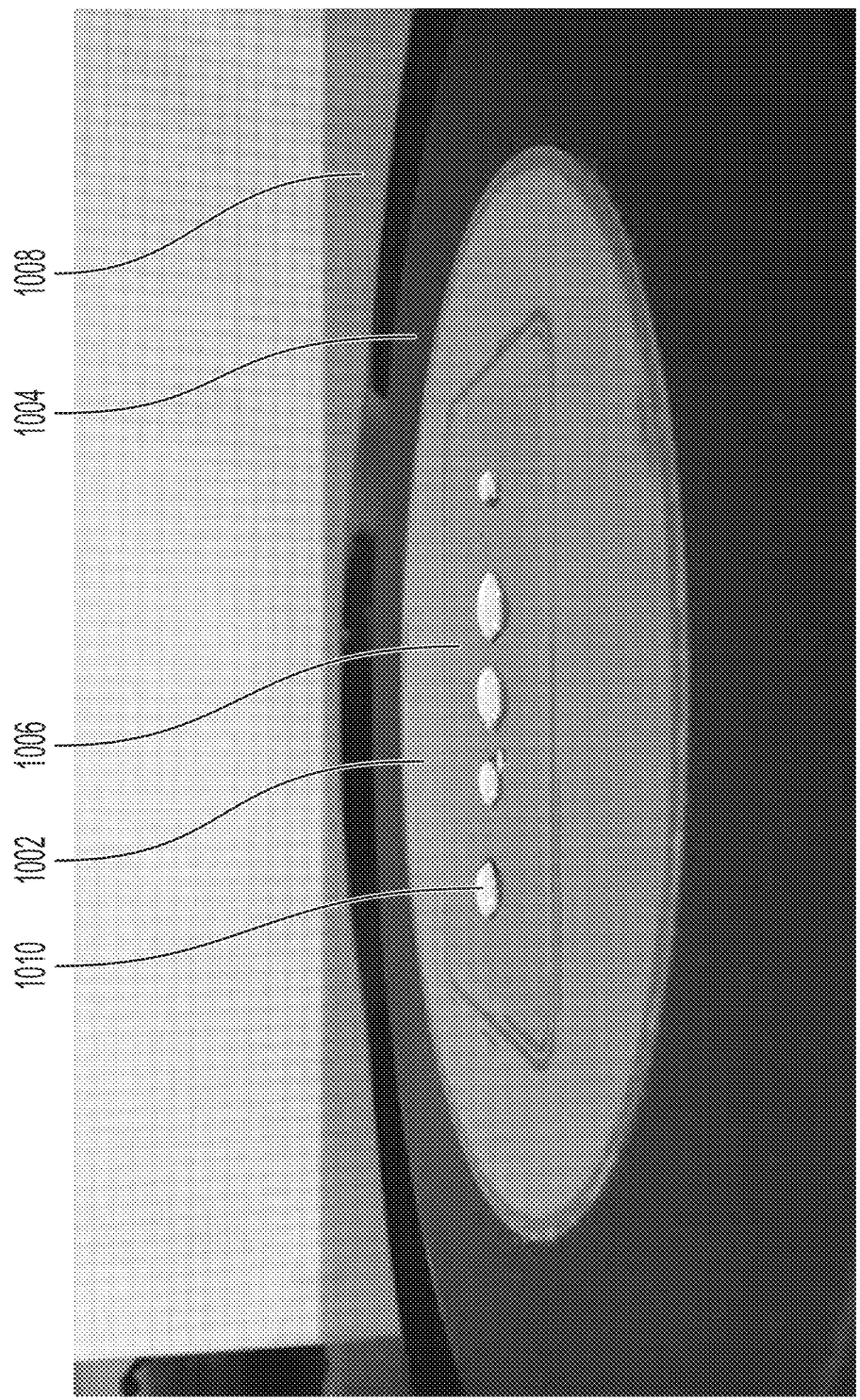
FIG. 10 is a photograph of isolated drops of an imaging artifact reducing fluid disposed on a transparent imaging window of a microscope during an illustrative method of preparing to image a sample, according to illustrative embodiments of the invention.

Various methods may be employed to produce an imaging artifact reducing fluid, disposed between a transparent imaging window and a transparent optical interface of a sample dish, having a substantially uniform thickness. In certain embodiments, an imaging artifact reducing fluid wets at least a portion of a transparent imaging window [e.g., corresponding to an opening in an imaging window support of a microscope (e.g., slightly larger than a field of view of the microscope)]. In certain embodiments, isolated drops of an imaging artifact reducing fluid are disposed on a transparent imaging window and a sample dish is disposed over the transparent imaging window thereby spreading the isolated drops of the imaging artifact reducing fluid such that the imaging artifact reducing fluid has the substantially uniform thickness contiguously over the at least a portion of the transparent imaging window through which the illumination beam can pass when imaging the sample. Spreading may occur, for example, at least in part by capillary forces and/or by applying pressure to the sample dish. FIG. 10 is a photograph of a plurality of isolated drops of imaging artifact reducing fluid 1010 disposed on transparent imaging window 1002 and directly over a portion of the transparent imaging window (e.g., aperture) corresponding to opening 1006 in imaging window support 1004. Housing 1008 and imaging window support 1004 of housing 1008 are also shown.

In certain embodiments, an imaging artifact reducing fluid is spread, at least in part, as a result of a sample being disposed on a sample dish. For example, the weight of the sample may produce pressure on the sample dish that is applied to an imaging artifact reducing fluid (e.g., a plurality of drops of the fluid) that causes it to spread. This spreading can coalesce a plurality of drops into a contiguous area of substantially uniform thickness. In certain embodiments, an imaging artifact reducing fluid is spread over at least a portion of a transparent imaging window (e.g., the entire transparent imaging window) using a spreading device (e.g., a squeegee or similar).

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

Having described certain implementations of sample dishes and methods of their use, it will now become apparent to one of skill in the art that other implementations incorporating the concepts of the disclosure may be used. Therefore, the disclosure should not be limited to certain implementations, but rather should be limited only by the spirit and scope of the following claims.

What is claimed:

1. A sample dish for use in imaging a sample, the dish comprising:
   a support member; and
   a substantially planar transparent optical interface having a sample side and a mounting side opposite the sample side, wherein the optical interface is attached to the support member,
   wherein the support member comprises a ditch that surrounds a periphery of the optical interface, the ditch comprises an outer lip, and the optical interface is disposed such that a surface of the optical interface on the sample side is entirely above the outer lip.

2. The sample dish of claim 1, wherein the sample dish is a single use dish.

3. The sample dish of claim 1, wherein the sample dish is sterile.

4. The sample dish of claim 1, wherein the sample side is exposed to a user when the sample dish is mounted on a microscope.

5. The sample dish of claim 1, comprising one or more manipulation elements that protrude from the ditch of the support member above the outer lip.

6. The sample dish of claim 5, wherein the one or more manipulation elements are two tabs sized and shaped to be grasped by a user's hands, wherein the two tabs are disposed around a periphery of the dish.

7. The sample dish of claim 5, wherein each of the one or more manipulation elements is a portion of the support member.

8. The sample dish of claim 5, wherein the one or more manipulation elements each protrude upwardly and outwardly from the outer lip above the optical interface.

9. The sample dish of claim 5, wherein the support member is a one-part component.

10. The sample dish of claim 1, wherein the optical interface has a circular cross section.

11. The sample dish of claim 10, wherein the optical interface has a diameter of at least 50 mm.

12. The sample dish of claim 1, wherein the optical interface comprises at least one of imaging grade plastic, sapphire, and glass.

13. The sample dish of claim 12, wherein the optical interface consists essentially of imaging grade plastic.

14. The sample dish of claim 1, wherein the optical interface has a thickness between 5 μm and 500 μm.

15. The sample dish of claim 14, wherein the optical interface has a thickness of about 50 μm.

16. The sample dish of claim 1, wherein the optical interface is sized and shaped such that only the optical interface of the sample dish contacts a microscope when the sample dish is mounted on the microscope.

17. The sample dish of claim 1, wherein the optical interface is flexible.

18. The sample dish of claim 1, wherein the ditch is at least 3 mm deep.

19. The sample dish of claim 1, wherein the ditch is sized and shaped to contain at least 5 mL of fluid.

20. The sample dish of claim 1, wherein the support member comprises a plurality of separation ribs disposed at least partially within the ditch such that the plurality of separation ribs partition the ditch.

21. The sample dish of claim 1, wherein the ditch comprises an inner lip and the optical interface is disposed on and above the inner lip.

22. The sample dish of claim 1, wherein the optical interface has a relative mass variation of no more than 0.1% as measured using a ASTM International D570 test.

23. The sample dish of claim 1, wherein an anti-reflection coating is disposed on the mounting side of the optical interface.

24. A set of sample dishes comprising a plurality of sample dishes according to claim 1, wherein, for each of the plurality of sample dishes, a thickness of the optical interface is within 5 µm of a standardized thickness for the set.

25. The set of sample dishes of claim 24, wherein the plurality of sample dishes comprises at least 20.

26. The sample dish of claim 1, wherein the support member has a surface roughness (Ra) of no more than 6 micrometers.

27. The sample dish of claim 1, wherein the support member comprises an outwardly sloped inner lip.

28. The sample dish of claim 1, wherein the optical interface is entirely above the outer lip.

29. The sample dish of claim 1, wherein the sample dish is mounted on an imaging system, the sample is disposed on the optical interface on the sample side, and the sample is accessible to a user during the imaging, wherein light is transmitted through the optical interface during the imaging.

30. A sample dish for use in imaging a sample, the dish comprising:
a flexible transparent optical interface comprising imaging grade plastic, the optical interface having a sample side and a mounting side opposite the sample side; and
a support member,
wherein the optical interface is attached to the support member and the optical interface is disposed such that a surface of the optical interface on the sample side is entirely above the support member.

31. The sample dish of claim 30, wherein the optical interface is disposed entirely above the support member.

* * * * *